(12) United States Patent
Wolfe et al.

(10) Patent No.: US 12,415,307 B2
(45) Date of Patent: *Sep. 16, 2025

(54) ENERGY EFFICIENT BLOW MOLDER CONTROL

(71) Applicant: AGR International, Inc., Butler, PA (US)

(72) Inventors: Georg V. Wolfe, Punta Gorda, FL (US);
William E. Schmidt, Butler, PA (US);
Sudha Jebadurai, Poland, OH (US);
Robert Cowden, Butler, PA (US)

(73) Assignee: AGR International, Inc., Butler, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,059

(22) Filed: Jun. 16, 2023

(65) Prior Publication Data

US 2023/0330912 A1    Oct. 19, 2023

Related U.S. Application Data

(63) Continuation of application No. 18/128,715, filed on Mar. 30, 2023, now Pat. No. 12,005,626, which is a continuation of application No. 17/361,614, filed on Jun. 29, 2021, now Pat. No. 11,772,317, which is a continuation of application No. 16/640,246, filed as (Continued)

(51) Int. Cl.
| | |
|---|---|
| *B29C 49/78* | (2006.01) |
| *B29C 49/42* | (2006.01) |
| *B29C 49/64* | (2006.01) |
| *B29L 31/00* | (2006.01) |

(52) U.S. Cl.
CPC ...... *B29C 49/783* (2013.01); *B29C 49/42394* (2022.05); *B29C 49/64* (2013.01); *B29C 49/78* (2013.01); *B29C 49/786* (2013.01); *B29L 2031/7158* (2013.01)

(58) Field of Classification Search
CPC .................................................. B29C 49/78
See application file for complete search history.

(56) References Cited

U.S. PATENT DOCUMENTS

| | | | |
|---|---|---|---|
| 5,062,052 A | 10/1991 | Sparer et al. | |
| 6,863,860 B1 | 3/2005 | Birckbichler et al. | |

(Continued)

FOREIGN PATENT DOCUMENTS

| | | |
|---|---|---|
| CN | 111183012 A | 5/2020 |
| DE | 10231345 A1 | 10/2003 |

(Continued)

*Primary Examiner* — Alison L Hindenlang
*Assistant Examiner* — Alexander A Wang
(74) *Attorney, Agent, or Firm* — K&L Gates LLP

(57) ABSTRACT

Blow molder system and associated method optimizes the performance, energy efficiency and/or operating costs of the blow molder. A blow molder controller executes a system model that relates blow molder input parameter changes to the characteristics of containers generated by the blow molder. Equipped with energy and/or operating cost data for operating the blow molder, the blow molder controller can select a set of blow molder input parameter changes for the blow molder that: drives the containers produced by the blow molder toward desired container characteristics, in an efficient amount of time, and in cost effective manner, considering the energy costs involved in implementing the changes.

33 Claims, 15 Drawing Sheets

Related U.S. Application Data application No. PCT/US2019/015564 on Jan. 29, 2019, now Pat. No. 11,065,804.

(60) Provisional application No. 62/625,202, filed on Feb. 1, 2018.

(56) References Cited

U.S. PATENT DOCUMENTS

| | | |
|---|---|---|
| 6,967,716 B1 | 11/2005 | Cochran et al. |
| 7,374,713 B2 | 5/2008 | Birckbichler et al. |
| 7,378,047 B2 | 5/2008 | Birckbichler et al. |
| 7,481,636 B2 | 1/2009 | Volker et al. |
| 7,763,194 B2 | 7/2010 | Feuilloley |
| 7,780,898 B2 | 8/2010 | Birckbichler et al. |
| 7,924,421 B2 | 4/2011 | Schmidt et al. |
| 8,004,667 B2 | 8/2011 | Kwirandt |
| 8,208,131 B2 | 6/2012 | Schilling et al. |
| 8,208,141 B2 | 6/2012 | Schmidt et al. |
| 8,463,422 B2 | 6/2013 | Betsche et al. |
| 8,818,755 B2 | 8/2014 | Wolfe et al. |
| 9,102,090 B2 | 8/2015 | Haesendonckx et al. |
| 2007/0290388 A1 | 12/2007 | Feuilloley |
| 2011/0180509 A1 | 7/2011 | Hutchinson et al. |
| 2012/0018925 A1 | 1/2012 | Schmidt et al. |
| 2012/0130677 A1 | 5/2012 | Wolfe et al. |
| 2012/0226376 A1 | 9/2012 | Haesendonckx et al. |
| 2016/0136868 A1 | 5/2016 | Haller |
| 2016/0151957 A1 | 6/2016 | Wolfe et al. |
| 2016/0176099 A1 | 6/2016 | Knapp et al. |
| 2017/0203495 A1 | 7/2017 | Derrien |
| 2019/0022915 A1 | 1/2019 | Zoelfl et al. |
| 2019/0240888 A1 | 8/2019 | Lössl et al. |
| 2020/0376736 A1 | 12/2020 | Cowden et al. |

FOREIGN PATENT DOCUMENTS

| | | |
|---|---|---|
| DE | 102006047150 A1 | 4/2008 |
| DE | 102008052609 A1 | 4/2010 |
| DE | 102010022405 A1 | 12/2011 |
| DE | 102012102356 A1 | 9/2013 |
| DE | 102013103543 A1 | 10/2014 |
| DE | 102014116891 A1 | 5/2016 |
| DE | 102014119563 A1 | 6/2016 |
| DE | 102016103117 A1 | 8/2017 |
| DE | 102016112121 A1 | 1/2018 |
| EP | 1348932 A2 | 10/2003 |
| JP | 2002049648 A | 2/2002 |
| JP | 2006205417 A | 8/2006 |
| JP | 2008521662 A | 6/2008 |
| JP | 2009529444 A | 8/2009 |
| MX | 379449 | 1/2021 |
| WO | 2019152365 A1 | 8/2019 |

ENERGY EFFICIENT BLOW MOLDER CONTROL

PRIORITY CLAIM

The present application is a continuation of U.S. application Ser. No. 18/128,715, filed Mar. 20, 2023, which is a continuation of U.S. application Ser. No. 17/361,614, filed Jun. 29, 2021, which is a continuation of U.S. application Ser. No. 16/640,246, filed Feb. 19, 2020, now U.S. Pat. No. 11,065,804, which is a national stage application under 35 U.S.C. § 371 of PCT application Serial No. PCT/US19/15564, filed Jan. 29, 2019, which PCT application claims priority to U.S. provisional application Ser. No. 62/625,202, filed Feb. 1, 2018, all having the same title and inventors as above.

TECHNICAL FIELD

The examples in this description and drawings generally relate to systems and methods for operating a reheat, stretch blow molder control system to improve energy efficiency.

BACKGROUND

Polyethylene terephthalate (PET) and other types of plastic containers are commonly produced utilizing a machine referred to as a reheat, stretch and blow molder. The blow molder receives preforms and outputs containers. When a preform is received into a blow molder, it is initially heated and placed into a mold. A rod stretches the preform while air is being blown into the preform causing it to stretch axially and circumferentially, and take the shape of the mold. A typical reheat, stretch and blow molder has between ten (10) and forty-eight (48) or more molds. This increases the product rate of the blow molder, but also increases the rate at which defective containers can be generated when there is a problem with one or more blow molding process parameters. Accordingly, container manufacturers are keen to detect and correct blow molding process problems as efficiently as possible.

In the course of manufacturing blow-molded containers, it is desirable to control the blow molder to achieve desired container properties including, desired container dimensions, material distribution, strength, the absence of defects, etc. This is typically accomplished manually. According to one common technique, an operator of the blow molder ejects a set of completed containers for off-line inspection. Various types of off-line inspections are used to measure different aspects of the container. Material or thickness distribution is often measured using a qualitative "squeeze" test and/or a quantitative section weight test. In a squeeze test, the operator, or other testing personnel, squeezes the container to obtain a qualitative indication of whether there is sufficient material at key locations of the container. In a section weight test, the container is physically divided into circumferential sections. Each section is individually weighted, yielding the section weights. Other common off-line inspections include top load and burst pressure tests to measure container strength, volumetric fill height and base clearance tests to measure container size and shape, etc. Based on the qualitative and quantitative results of tests such as these, the operator modifies input parameters of the blow molder to move material to the appropriate locations within the bottle.

On-line inspection systems, such as the Intellispec™ product, available from Pressco Technology Inc. of Cleveland Ohio and the PET-View product, available from the Krones Group of Neutraubling, Germany, utilize computer vision to inspect containers either in or downstream of the blow molder and reject mal-formed containers. These systems improve the quality of the container production by removing containers with randomly occurring damage, inclusions, and grossly formed containers, but have limited success addressing process related issues that drive container quality and performance.

Other inspection systems, such as the Pilot Profiler® infrared absorption measurement devices available from AGR International of Butler, Pennsylvania, are capable of measuring the material distribution of individual containers. The measurements are made using a series of emitters and sensors that are located either within or downstream of the blow molder. The sensors are oriented towards the sidewalls of the containers and generate measurements on the containers at 12.5 mm intervals, thus providing a profile of material distribution in the container sidewalls. Also, advanced vision systems, such as the Pilot Vision™ system, also available from AGR International, Inc. of Butler, Pennsylvania, provide increased resolution and are able to detect more subtle container defects.

Some existing systems utilize feedback from on-line container inspection systems to modify blow molder input parameters. For example, the Sidel S.A.S. Company of Le Havre, France, has introduced a blow molder with a mold control loop that to accommodate variations in the temperature of performs arriving at the mold. The mold control loop controls the pre-blow start and pre-blow pressure to detect changes in preform properties and adapts the pre-blow pressure profile to account for any variations in preform energy or energy distribution.

Another process control system is the Process Pilot® product, available from AGR International, Inc. of Butler, Pennsylvania. The Process Pilot® product is a closed loop control system used to manage the re-heat stretch and blow molding process. An infrared absorption-type measurement system, such as the Pilot Profiler® system described above, is used to generate a material distribution profile. The Process Pilot® product learns the relationship between the container blowing process and the location of the material in the container with a series of automated measurements made in conjunction with adjustments to the blow molder input parameters. This information forms the basis for future adjustments to the blow molder. A custom equation is used to express the relationship between blow molder input parameters and resulting material distributions. A control loop is implemented by establishing a baseline material distribution and baseline values for the various blow molder inputs. As the material distribution drifts during the blow molding process, relationship between the blow molder input parameters and container characteristics is utilized in conjunction with additional mathematics to determine blow molder parameter values that minimize the difference between the baseline and the measured material distribution while also minimizing control changes relative to baseline blow molder input parameters. The Process Pilot® product can be operated continuously to minimize the overall process variation.

SUMMARY

In one general aspect, the present invention is directed to a system and associated method of operating a blow molder that optimizes the performance, energy efficiency and/or operating costs of the blow molder. A blow molder controller executes a system model that relates blow molder input parameter changes to the characteristics of containers generated by the blow molder. Equipped with energy and/or operating cost data for operating the blow molder, the blow molder controller can select a set of blow molder input parameter changes for the blow molder that: drives the containers produced by the blow molder toward desired container characteristics, in an efficient amount of time, and in cost effective manner, considering the energy costs involved in implementing the changes. These and other benefits realizable through embodiments of the present invention will be apparent from the description that follows.

FIGURES

Various embodiments are described herein by way of example in conjunction with the following figures, wherein.

DESCRIPTION

Figure 1:
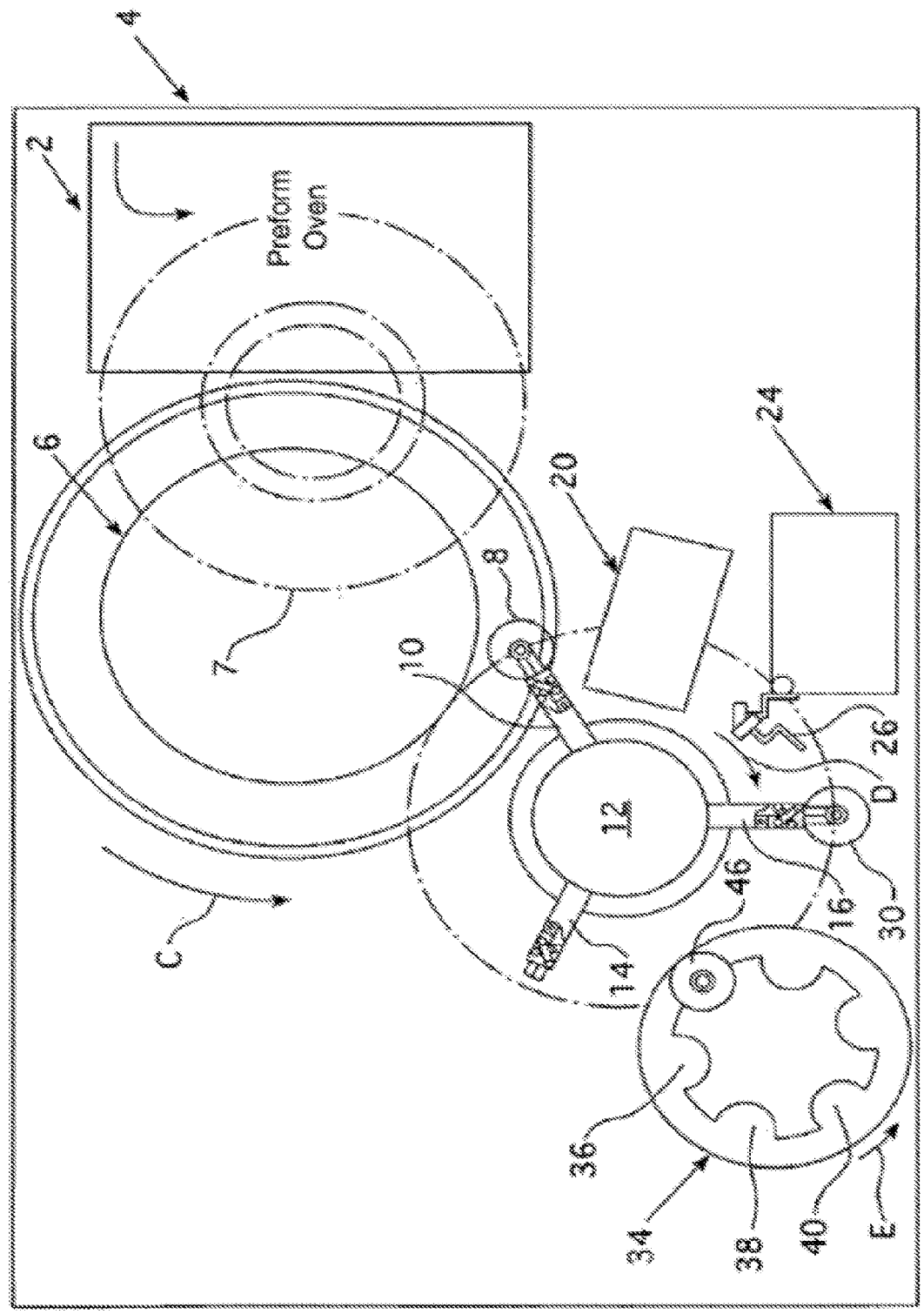
FIG. 1 is a block diagram showing one embodiment of a blow molder system.

Various embodiments described herein are directed to systems and methods for improving the efficiency (e.g., energy efficiency) of a blow molder controller. A blow molder controller executes a system model that relates blow molder input parameter changes to the characteristics of containers generated by the blow molder. In one embodiment, an operating cost module of the blow molder controller evaluates sets of input parameter changes generated using the system model in view of energy and/or other similar costs. The blow molder controller implements a set of blow molder input parameter changes that balances effectiveness and energy cost efficiency.

Operators of blow molders want to lower their operating costs and also be more effective stewards of the environment. Operators and manufacturers of blow molders may address this issue in several ways. For example, blow molder manufacturers have developed blow molders with more efficient ovens and improvements to the way that high pressure air is managed. Also, blow molder input parameters may be managed in a way that saves operating costs. Trends in container manufacturing towards lower resin weights for blow molded containers, however, makes it difficult for blow molder operators to manage input parameters to save operating costs without also adversely affecting container properties. Further complicating the matter is the fact that each of the adjustable blow molder input parameters can have an asymmetrical impact on operating costs. This makes it nearly impossible for an operator to manually optimize the process for operating cost while maintaining container performance.

Various blow molder controllers described herein are configured to manage the blow molding process in a small operating window while reducing the operating cost. A blow molder controller implements a system model that relates the material distribution or container characteristics, such as thickness, crystallinity, etc., to particular blow molder input parameters. The blow molder controller monitors the characteristics of containers produced by the blow molder and adjusts the blow molder input parameters according to the system model to drive the container to a desired set of characteristics. The blow molder input parameters may be operating condition changes to the operating parameters of the blow molder (e.g., temperatures, pressures, etc.) that cause the blow molder system to produce/form container with the desired set of container characteristics. For example, the blow molder input parameters can include a change to at least one of following operating parameters of the blow molder system: the oven temperature, total oven power, individual oven lamp power, preform temperature set point, pre-blow start, pre-blow duration, stretch rod timing, blow pressure, pre-blow timing, pre-blow pressure, power levels for individual heater elements of the plurality of molds, preform temperature set points, stretch rod timing, stretch rod temperature, blow pressure, etc.

The blow molder controller is programmed to use the system model to generate multiple sets of input parameter changes in response to sensed characteristics of generated containers. Each set of input parameter changes modifies the operation of the blow molder to move the characteristics of containers generated by the blow molder toward desired (e.g., baseline) characteristic values, referred to herein as baseline container characteristics. Different sets of input parameter changes move the blow molder towards the baseline characteristics with differing levels of accuracy and/or time.

The blow molder controller also executes an operating cost module. The operating cost module receives operating cost data describing the cost of electricity, heat, and/or other energy being consumed by the blow molder. These data, e.g., the local electricity, heat and pressurized air costs for the plant, may be input by an operator of the blow molder system 4 or a plant manager, for example, via a local or remote user interface of the blow molder controller 102. Operating cost data, in some examples, also describes the effect that changing a blow molder input parameter on one blow molder system can have on other blow molder systems in the same plant. For example, plants including multiple blow molder systems may generate high pressure air at one or more centralized locations and distribute the high pressure air to multiple blow molder system. A change to the pre-blow pressure, pre-blow timing, high-pressure blow pressure, high-pressure blow timing, or other high pressure air-related input parameters may have an effect on other blow molder systems, for example, downstream on a common high pressure air manifold. From these factors, the operating cost module determines the operating cost associated with each of the set of input parameter changes determined using the system model. The operating cost module selects a set of input parameter changes that balances accuracy and speed with operating cost. That is, the blow molder control selects a set of input parameter changes that optimizes multiple factors, including (1) achieving or satisfying the desired container characteristics, (2) the time it takes to drive the containers to the desired container characteristics, and (3) the operating costs associated with implementing the blow molder input parameters to update the operating parameters of the blow molders to meet the desired container characteristics.

Before describing the blow molder controller in more detail, an overview of a blow molder system is provided. FIG. 1 is a block diagram showing one embodiment of a blow molder system 4 according to various embodiments. The blow molder system 4 includes a preform oven 2 that typically carries the plastic preforms on spindles through the oven section so as to preheat the preforms prior to blow-molding of the containers. The preform oven 2 may comprise, for example, infrared heating lamps or other heating elements to heat the preforms above their glass transition temperature. Many blow molders 6 utilize preform ovens defining multiple heating elements positioned to heat different portions of the preforms. The preforms leaving the preform oven 2 may enter the blow molder 6 by means, for example, of a conventional transfer system 7 (shown in phantom).

The blow molder 6 may comprise a number of molds, such as on the order of ten to twenty-four, for example, arranged in a circle and rotating in a direction indicated by the arrow C. The preforms may be stretched in the blow molder 6, using a fluid (e.g., air or a liquid) and/or a core rod, to conform the preform to the shape defined by the mold. In many blow molders that use air to stretch the containers, an initial pre-blow is utilized to begin the container formation process followed by a high-pressure blow to push the now-stretched walls of the preform against the mold. Depending on the type of container to be generated, the molds may be heated (a hot mold process) or cooled (a cold mold process). Containers emerging from the blow molder 6, such as container 8, may be suspended from a transfer arm 10 on a transfer assembly 12, which is rotating in the direction indicated by arrow D. Similarly, transfer arms 14 and 16 may, as the transfer assembly 12 rotates, pick up the container 8 and transport the container through the inspection area 20, where it may be inspected by one or more of the inspection systems described below. A reject area 24 has a reject mechanism 26 that may physically remove from the transfer assembly 12 any containers deemed to be rejected. In some embodiments, the blow molder system 4 may include alternate inspection areas.

In the example of FIG. 1, the container 30 has passed beyond the reject area 24 and may be picked up in a star wheel mechanism 34, which is rotating in direction E and has a plurality of pockets, such as pockets 36, 38, 40, for example. A container 46 is shown in FIG. 1 as being present in such a star wheel pocket. The containers may then be transferred in a manner known to those skilled in the art to a conveyer or other transport mechanism according to the desired transport path and nature of the system. It will be appreciated that the blow molder system 4 may comprise one or more inspection areas in addition to or instead of the inspection area 20. For example, alternate inspection areas may be created by adding additional transfer assemblies, such as transport assembly 12. Also, alternate inspection areas may be positioned on a conveyor or other position down-line from the blow molder 6.

The blow molder system 4 may produce containers at a rate of 20,000 to 120,000 per hour, though manufacturers continue to develop blow molders with increasing speed and in some embodiments it may be desirable to run the blow molder system 4 at lower rates. The blow molder system 4 receives various inputs parameters that affect the characteristics of the generated containers. For example, the preform oven 2 may receive an overall temperature input parameter, referred to as a preform temperature set point, as well as additional input parameters that define the distribution of heat between the individual heating elements. Other controllable parameters include, for example, a pre-blow timing, a pre-blow pressure, etc.

Figure 2:
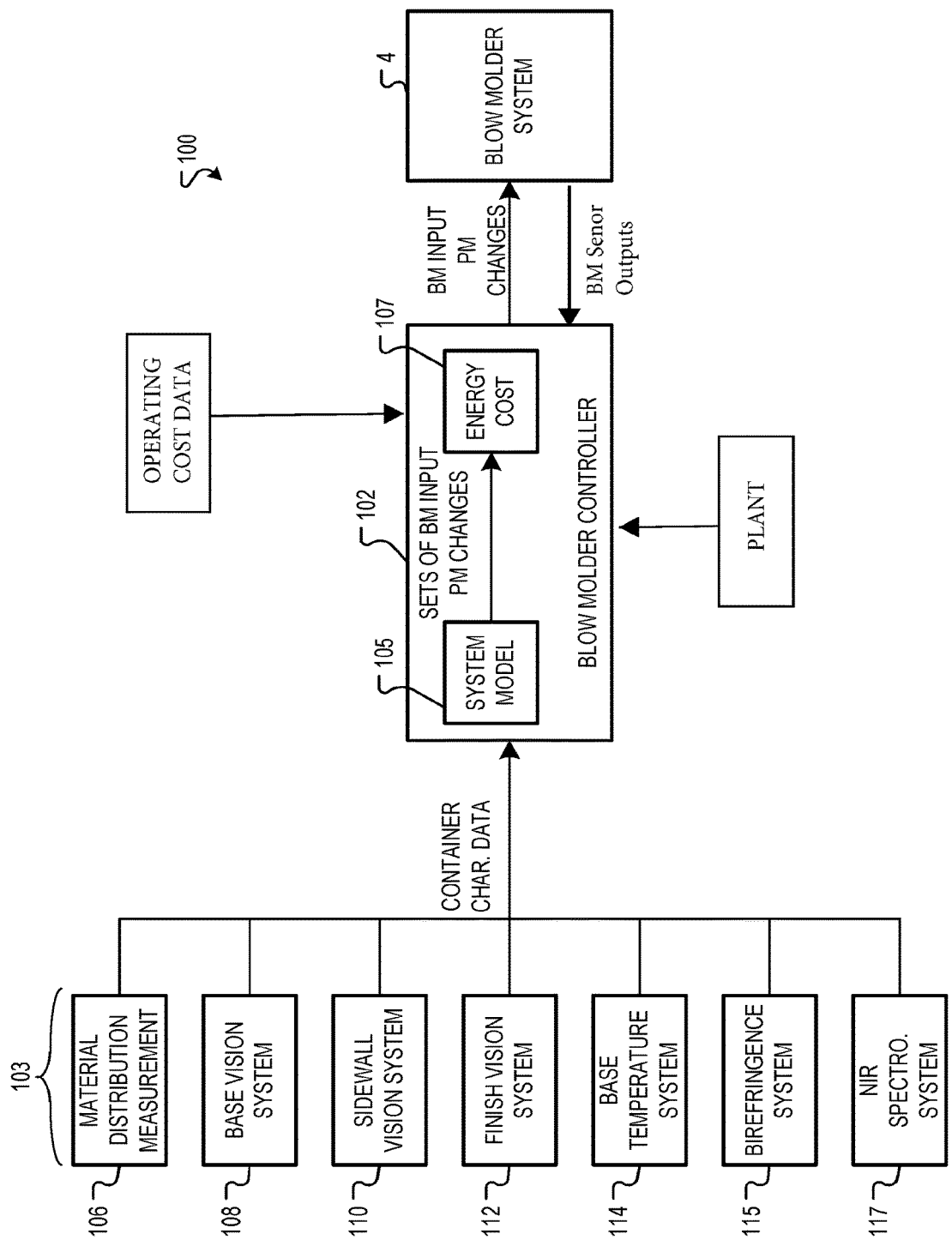
FIG. 2 is a block diagram of one embodiment of a blow molder control system.

FIG. 2 is a block diagram of one embodiment of a blow molder control system 100. The system 100 comprises the blow molder system 4, a blow molder controller 102, and various inspection systems 103. The inspection systems 103 are positioned to sense characteristics of containers produced by the blow molders. The inspection systems 103 may be placed on-line to sense characteristics of the containers as they are produced by the blow molder system 4, such as the inspection system 20 in FIG. 1. The blow molder controller 102 may comprise one or more servers or other computer devices. The blow molder controller 102 receives signals from the various inspection systems 103 indicating container characteristics and receives outputs from sensors from the blow molder system 4. The sensors of the blow molder system may comprise, for example, an oven temperature sensor, a preform feed rate sensor, a timer for generating time stamps for when containers are blown, individual mold temperature sensors, perform temperature sensors, etc. As such, the blow molder controller 102 can receive data from the blow molder system 4 indicative the oven temperature, the preform feed rate, the timestamps for when containers are blown, individual mold temperatures, preform temperatures, etc. The blow molder controller 102 can also receive sensors from the plant in which the blow molder system(s) is housed, such as the ambient temperature, atmospheric pressure, and moisture in the plant. Based on these input data, the blow molder controller 102 can generate blow molder input parameters or changes thereto to cause the blow molder system 4 to generate containers within desired tolerances, as described herein below. The blow molder controller 102 may also references inputs from sensors related to the blow molder 4, as described herein. The blow molder controller 102 comprises a system model 105 and an operating cost module 107, as described herein.

Various different types of inspection systems 103 may be used. For example, a material distribution system 106 measures a material distribution profile of the container. According to various embodiments, the material distribution system 106 finds the material distribution of containers after formation (e.g., either in or downstream of the blow molder system 4). For example, the material distribution system 106 may be used to take multiple direct or indirect readings of one or more container characteristics across a profile (e.g., a vertical profile) of the container. The container characteristics may comprise, for example, wall thickness (e.g., average 2-wall thickness), mass, volume, etc. Material distribution may be derived from any of these measurements. The system 106 may utilize measured container characteristics found across the profile of the container to derive a material distribution of the container. In some, but not all, embodiments, the measurements, and therefore the calculated material distribution, need only be taken across the oriented or stretched parts of the container and may exclude non-oriented portions of the container such as, for example, a finish area, a base cup, etc. Calculations for converting raw measurements to a material distribution may be performed by on-board computing equipment associated with the system 106 and/or by the blow molder controller 102.

Figure 3:
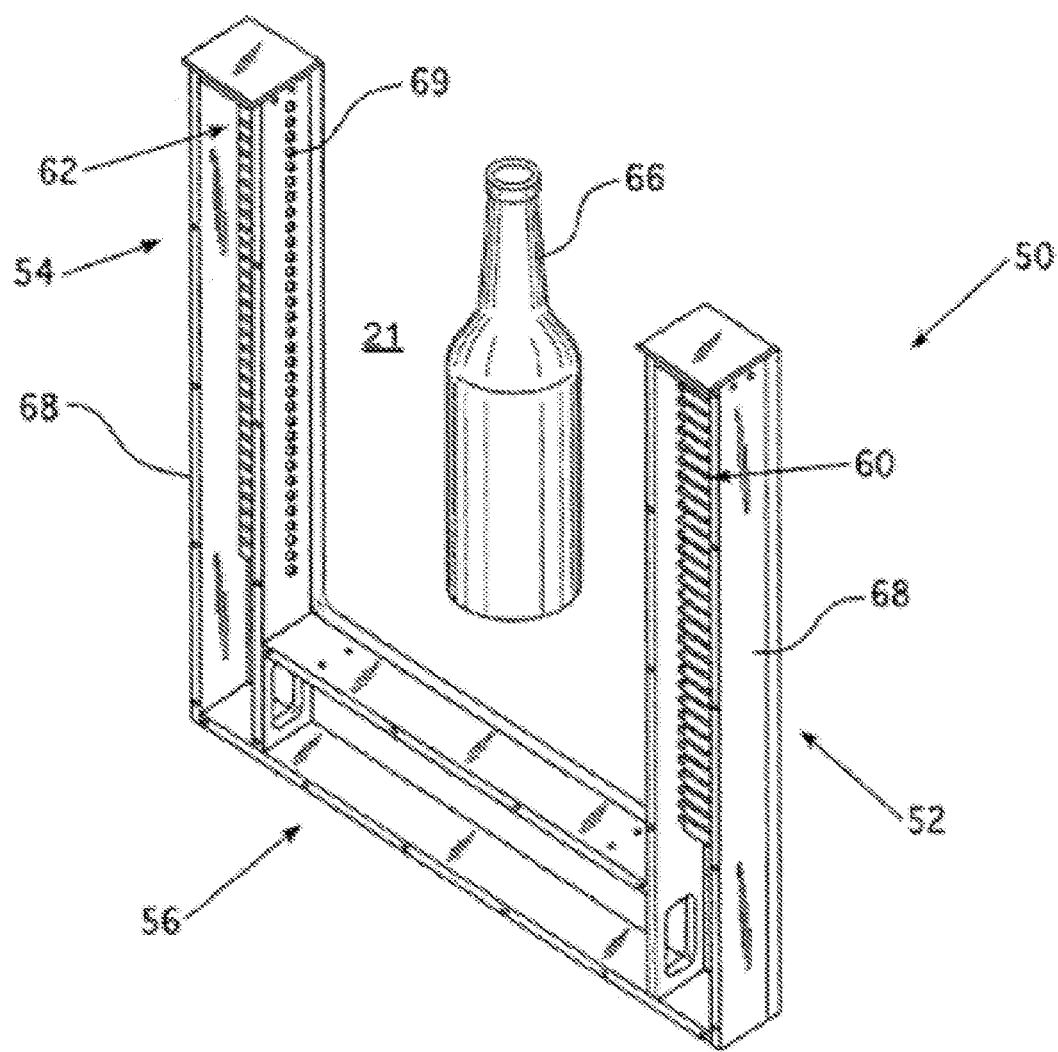
FIG. 3 illustrates one embodiment of a measuring device that may be associated with the material distribution system.

The material distribution system 106 may utilize any suitable type of measurement device capable of measuring a material distribution profile. For example, FIG. 3 illustrates one embodiment of a measuring device 50 that may be associated with the material distribution system 106. The measuring device 50 may be an in-line inspection system that inspects the containers as they are formed, as fast as they are formed, without having to remove the containers from the processing line for inspection and without having to destroy the container for inspection. The measuring device 50 may determine characteristics of each container formed by the blow molder system 4 (e.g., average 2-wall thickness, mass, volume, and/or material distribution) as the formed containers are rotated or otherwise transported through an inspection area 21 following blow molding. The inspection area 21 may be positioned similar to the example inspection area 20 shown in FIG. 1 and/or at any other suitable in-line location, for example, as described above. Following blow molding, containers, such as the container 66 in FIG. 3, are passed through the inspection area 21 of the measuring device 50 by any suitable mechanism such as, for example, a transfer assembly such as the transfer assembly 12, a conveyor, etc.

As shown in FIG. 3, the measuring device 50 may comprise two vertical arms 52, 54, with a cross bar section 56 there between at the lower portion of the arms 52, 54. One of the arms 52 may comprise a number of light energy emitter assemblies 60, and the other arm 54 may comprise a number of broadband sensors 62 for detecting light energy from the emitter assemblies 60 that passes through a plastic container 66 passing between the arms 52, 54. Thus, light energy from the emitter assembly 60 that is not absorbed by the container 66 may pass through the two opposite sidewalls of the container 66 and be sensed by the sensors 62. The container 66 may be rotated through the inspection area 20 between the arms 52, 54 by the transfer assembly 12 (see FIG. 1). In other embodiments, a conveyor may be used to transport the containers through the inspection area 20.

According to various embodiments, the emitter assemblies 60 comprises a pair of light emitting diodes (LED's), laser diodes, etc., that emit light energy at different, discrete narrow wavelengths bands. For example, one LED in each emitter assembly 60 may emit light energy in a narrow band wavelength range where the absorption characteristics of the material of the container are highly dependent on the thickness of the material of the plastic container 66 ("the absorption wavelength"). The other LED may emit light energy in a narrow band wavelength that is substantially transmissive ("the reference wavelength") by the material of the plastic container 66. According to various embodiments, there may be one broadband sensor 62 in the arm 54 for each emitter 60 in the arm 52. Based on the sensed energy at both the absorption and reference wavelengths, the thickness through two walls of the container 66 can be determined at the height level of the emitter-sensor pair. This information can be used in determining whether to reject a container because its walls do not meet specification (e.g., the walls are either too thin or too thick). This information can also be used as feedback for adjusting parameters of the preform oven 2 and/or the blow molder 6 (FIG. 1) according to various embodiments, as described further below.

The more closely the emitter-sensor pairs are spaced vertically, the more detailed thickness information, along the vertical profile of the container, can be obtained regarding the container 66. According to various embodiments, there may be between three (3) and fifty (50) such emitter-sensor pairs spanning the height of the container 66 from top to bottom. For example, there may be thirty-two emitter-sensor pairs spaced every 0.5 inches or less, although additional emitter-sensor pairs may be used, depending on the circumstances. Such closely spaced emitter-sensor pairs can effectively provide a rather complete vertical wall thickness profile for the container 66. In some embodiments with closely spaced emitter-sensor pairs, adjacent emitter-sensor pairs may be configured to operate at a small time offset relative to one another so as to minimize cross-talk.

According to various embodiments, when the measuring device 50 is used to inspect plastic or PET containers 66, the absorption wavelength narrow band may be around 2350 nm, and the reference wavelength band may be around 1835 nm. Of course, in other embodiments, different wavelength bands may be used. As used herein, the terms "narrow band" or "narrow wavelength band" means a wavelength band that is less than or equal to 200 nm full width at half maximum (FWHM). That is, the difference between the wavelengths at which the emission intensity of one of the light sources is half its maximum intensity is less than or equal to 200 nm. Preferably, the light sources have narrow bands that are 100 nm or less FWHM, and preferably are 50 nm or less FWHM.

The arms 52, 54 may comprise a frame 68 to which the emitter assemblies 60 and sensors 62 are mounted. The frame 68 may be made of any suitable material such as, for example, aluminum. Controllers on circuit boards (not shown) for controlling/powering the emitter 60 and sensors 62 may also be disposed in the open spaces defined by the frame 68. The crossbar section 56 may be made out of the same material as the frame 68 for the arms 52, 54.

The frame 68 may define a number of openings 69 aimed at the inspection area 20. As shown in FIG. 3, there may be an opening for each sensor 62. There may also be a corresponding opening for each emitter assembly 60. Light energy from the emitter assemblies may be directed through their corresponding opening into the inspection area 20 and toward the sensors 62 behind each opening 69. One example of a system such as that described above is set forth in U.S. Pat. No. 7,924,421 filed on Aug. 31, 2007.

Another type of measuring device that may be used utilizes a broadband light source, a chopper wheel, and a spectrometer to measure the wall thickness of the container as it passes through an inspection area between the light source and the spectrometer after being formed by a blow molder. The broadband light source in such a system may provide chopped IR light energy that impinges the surface of the plastic container, travels through both walls of the container, and is sensed by the spectrometer to determine absorption levels in the plastic at discrete wavelengths. This information may be used, for example, by a processor, to determine characteristics of the plastic bottle, such as wall thickness, material distribution, etc. In practice, such systems may use a thermal source to generate broadband light within the visible and infrared spectrums of interest. The broadband light is chopped, collimated, transmitted through two walls of the plastic container, and finally divided into wavelengths of interest by the spectroscope. Examples of similar systems are provided in U.S. Pat. No. 6,863,860, filed on Mar. 26, 2002, U.S. Pat. No. 7,378,047, filed on Jan. 24, 2005, U.S. Pat. No. 7,374,713, filed on Oct. 5, 2006, and U.S. Pat. No. 7,780,898, filed Apr. 21, 2008. In yet other embodiments, the sensor(s) 62 may be on the same side of the passing containers as the emitter assembly(ies) 60 and sense light that is reflected by the front and back surfaces of the front sidewall of a passing container.

In various embodiments, the inspection systems 103 may also include various vision and other systems including, for example, a base vision system 108, a sidewall vision system 110 a finish vision system 112, a base temperature sensor system 114. Optionally, the inspection systems 103 may also include sensor systems for directly measuring crystallinity. For example, a birefringence sensor 115 may measure crystallinity in cold mold-generated containers. A near infrared (NIR) spectroscopy sensor may measure crystallinity in hot mold-generated containers. Any or all of the various inspection systems 103 may be configured to operate in-line and inspect the containers as they are formed, as fast as they are formed, without having to remove the containers from the processing line for inspection and without having to destroy the container for inspection.

Figure 4:
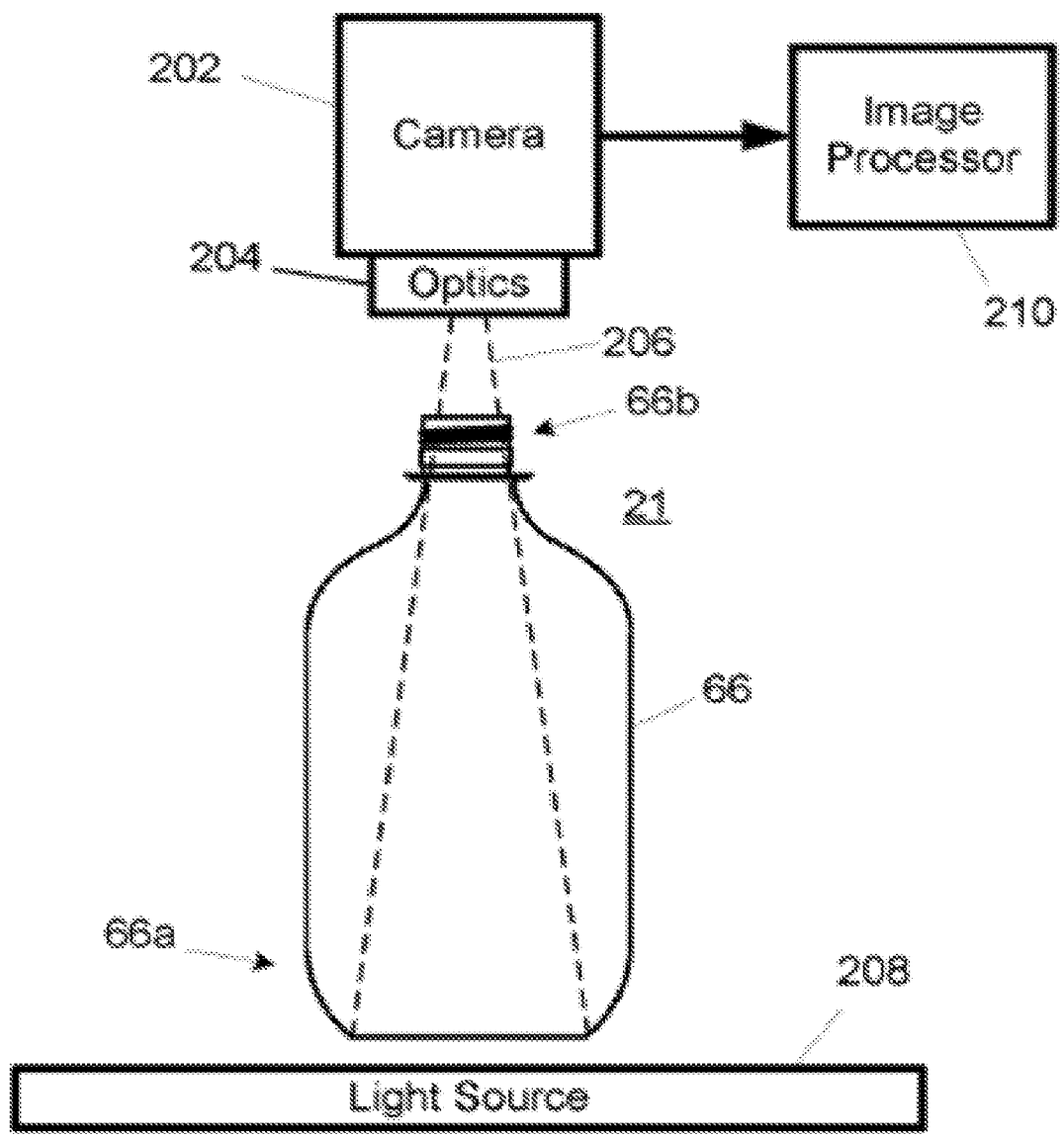
FIG. 4 is a block diagram showing one embodiment of a base vision system.

The vision system or systems may be similar to the vision system used in the infrared absorption measurement devices available from AGR International, Inc. of Butler, Pennsylvania, or as described in U.S. Pat. No. 6,967,716, filed on Apr. 21, 2000. FIG. 4 is a block diagram showing one embodiment of a base vision system 108. The system 108 comprises a camera 202, optics 204, a light source 208 and an optional image processor 210. Images may be taken while the container 66 is in the inspection area 21, with the container 66 positioned vertically between the lower light source 208 and the upper/overhead camera 202. Resulting images may be useful, as described herein below, for determining the presence of haze or pearlescence in the container 66. Images from the camera 202 may be provided to an image processor 210, which may perform various pre-processing and/or evaluate the images to determine properties of the container 66 such as, clarity status (e.g., haze or pearlescence status), (various container dimensions, etc.). Examples of systems for determining the clarity status of blow-molded containers are provided in U.S. Pat. No. 9,539,756, issued Jan. 10, 2017. In some embodiments, the image processor 210 is omitted and image processing is performed by the blow molder controller 102. In the embodiment shown in FIG. 4, the camera 202 and optics 204 are positioned above the container 66. The optics 204 may include various lenses or other optical components configured to give the camera 202 an appropriate field of view 206 to sense the base area 66a of the container 66 through the finish 66b. It will be appreciated that other configurations of the base vision system 108 are also possible. In some embodiments, the positions of the camera/optics 202/204 and light source 208 may be reversed. Also, in some embodiments, additional cameras (not shown) having additional fields of view may be utilized.

Figure 5:
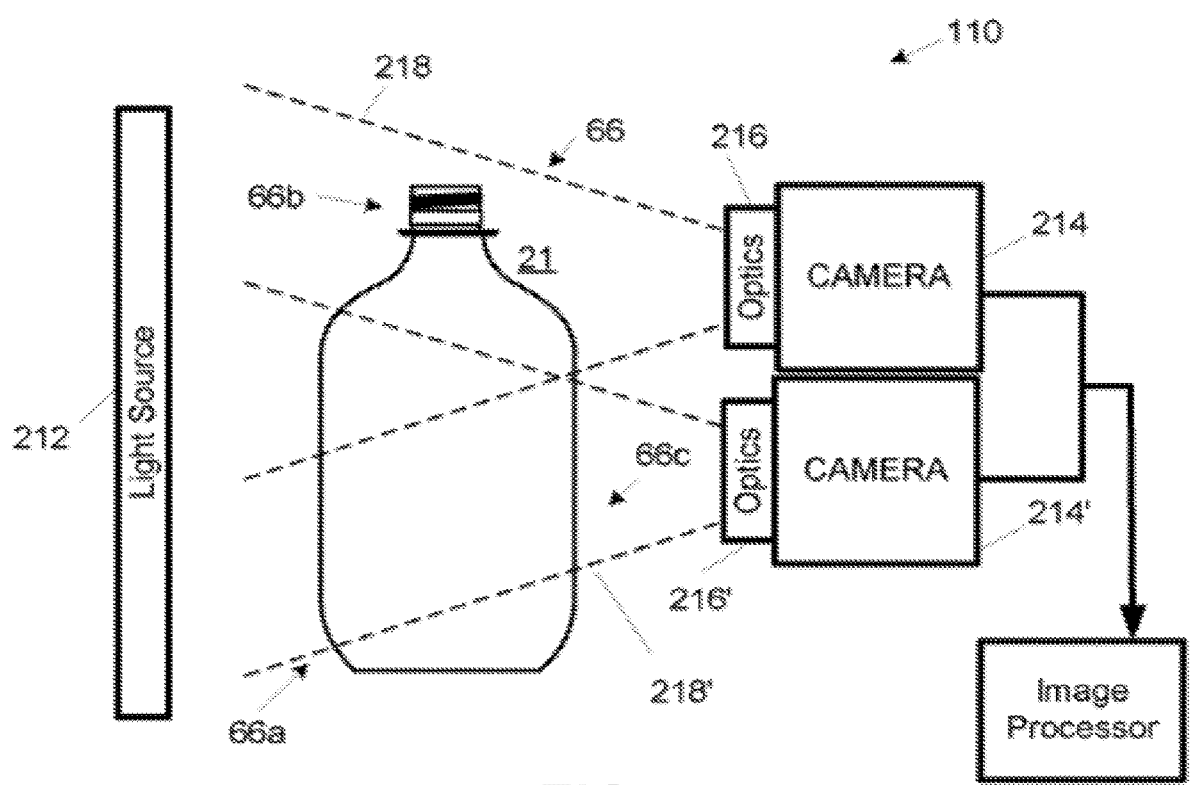
FIG. 5 is a block diagram showing one embodiment of a sidewall vision system.

FIG. 5 is a block diagram showing one embodiment of a sidewall vision system 110. The illustrated example sidewall vision system 110 comprises two cameras 214, 214', two optics assemblies 216, 216' a light source 212 and the optional image processor 210'. Images may be taken while the container 66 is in the inspection area 21, with the container positioned between the light source 212 and the cameras 214, 214; that is, the light source 212 and cameras 214, 214' are positioned on opposite sides of the container 66 as shown in FIG. 5 As illustrated, the two cameras 214, 214' and optics 216, 216' are configured to generate respective fields of view 218, 218' that show sidewall regions 66c of the container 66. The image processor 210' may perform various processing on images generated by the camera 214 including, for example, detecting container defects, detecting the clarity status (e.g., haze or pearlescence status) of the container, etc. In some embodiments, the image processor 210' performs pre-processing on images generated by the camera 214, with further processing performed directly by the blow molder controller 102. Also, in some embodiments, the image processor 210' may be omitted altogether. Also, in some embodiments, one or more of the cameras 214, 214' may be omitted and/or additional cameras with additional fields of view (not shown) added.

Figure 6:
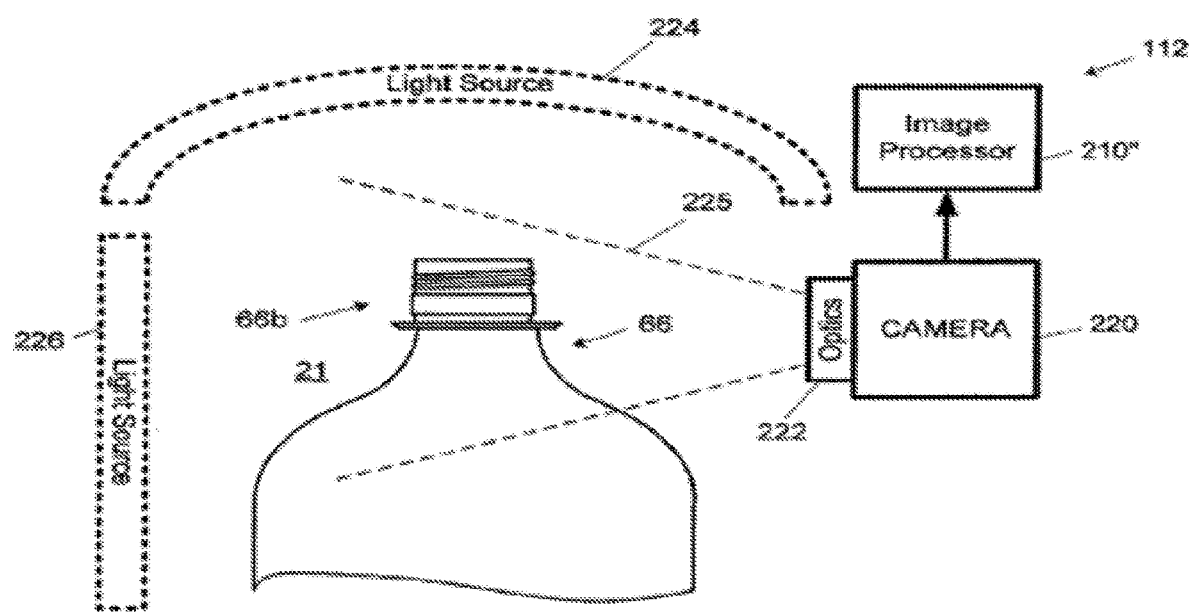
FIG. 6 is a block diagram showing one embodiment of a finish vision system.
Figure 7:
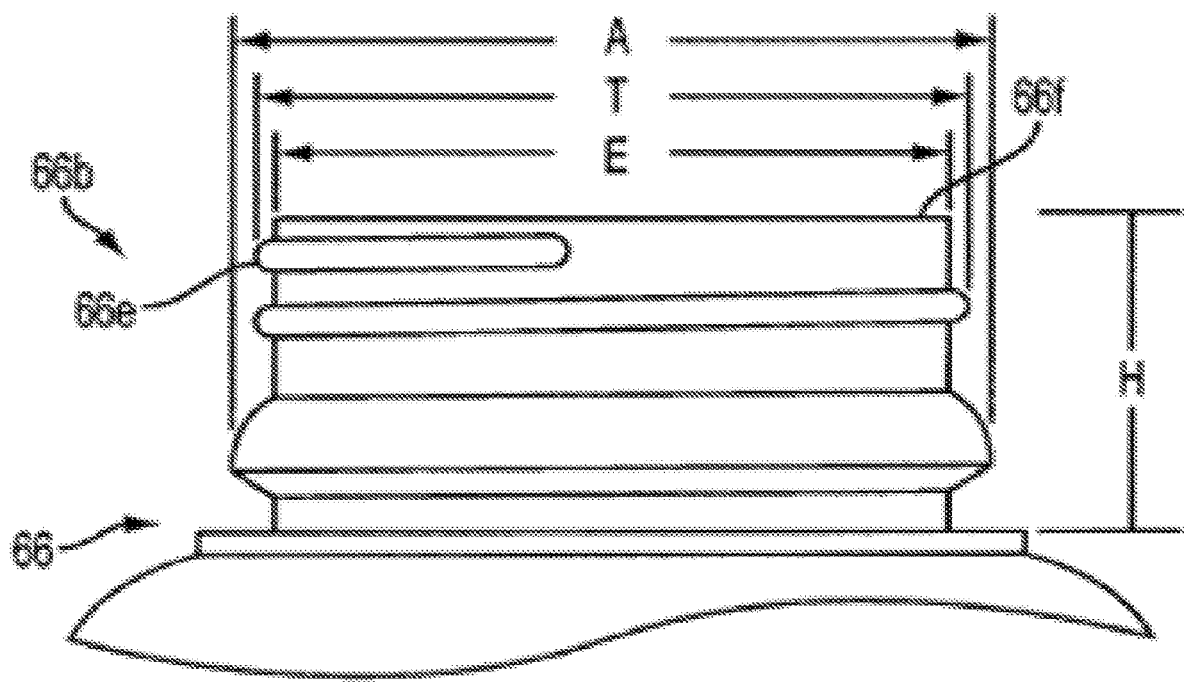
FIG. 7 is a diagram showing example finish dimensions that may be measured utilizing the finish vision system.

FIG. 6 is a block diagram showing one embodiment of a finish vision system 112. The illustrated example finish vision system 112 comprises a camera 220, optics 222, light sources 224, 226, and the optional image processor 210". Images may be taken while the container 66 is in the inspection area 21, with the container positioned between the light sources 224, 226 and the camera 220, such that the light source 226 and the camera 220 are positioned on opposite sides of the container 66 and such that the light source 224 is above the container 66. As illustrated, the camera 220 and optics 222 are configured to generate a field of view 225 that includes the finish area 66b of the container 66. In some configurations, the finish vision system 112 comprises a backlight source 226 positioned in the field of view 225 to illuminate the finish 66b. Also, in some embodiments, the finish vision system 112 comprises a round or bowl shaped light source 224 positioned above the finish 66b. An image processor 210" may perform various processing on images including, for example, deriving from the images various container characteristics (e.g., dimensions, clarity status, etc.). Some or all of the image processing, however, may be performed by the blow molder controller 102 and, in some embodiments, the image processor 210" may be omitted. FIG. 7 is a diagram showing example finish dimensions that may be measured utilizing the finish vision system 112. For example, the dimension H indicates a height of the finish. A dimension A indicates a total width of the finish 66b. A dimension T indicates a width of the threads 66e of the container 66. A dimension E indicates a width of the seal 66f of the finish.

It will be appreciated that the various vision systems 108, 110, 112 may be embodied by any suitable type of system capable of generating images of the desired portions of the containers 66. For example, the base and sidewall vision systems 108, 110 may be implemented utilizing the Pilot Vision™ system, available from AGR International, Inc. of Butler, Pennsylvania. The finish vision system 112 may be implemented utilizing the Opticheck™ system, also available from AGR International, Inc. of Butler, Pennsylvania. It will further be appreciated that images from additional perspectives may be obtained by positioning cameras and light sources at different locations, for example, within the inspection area 20 or downstream of the blow molder system 4.

Figure 8:
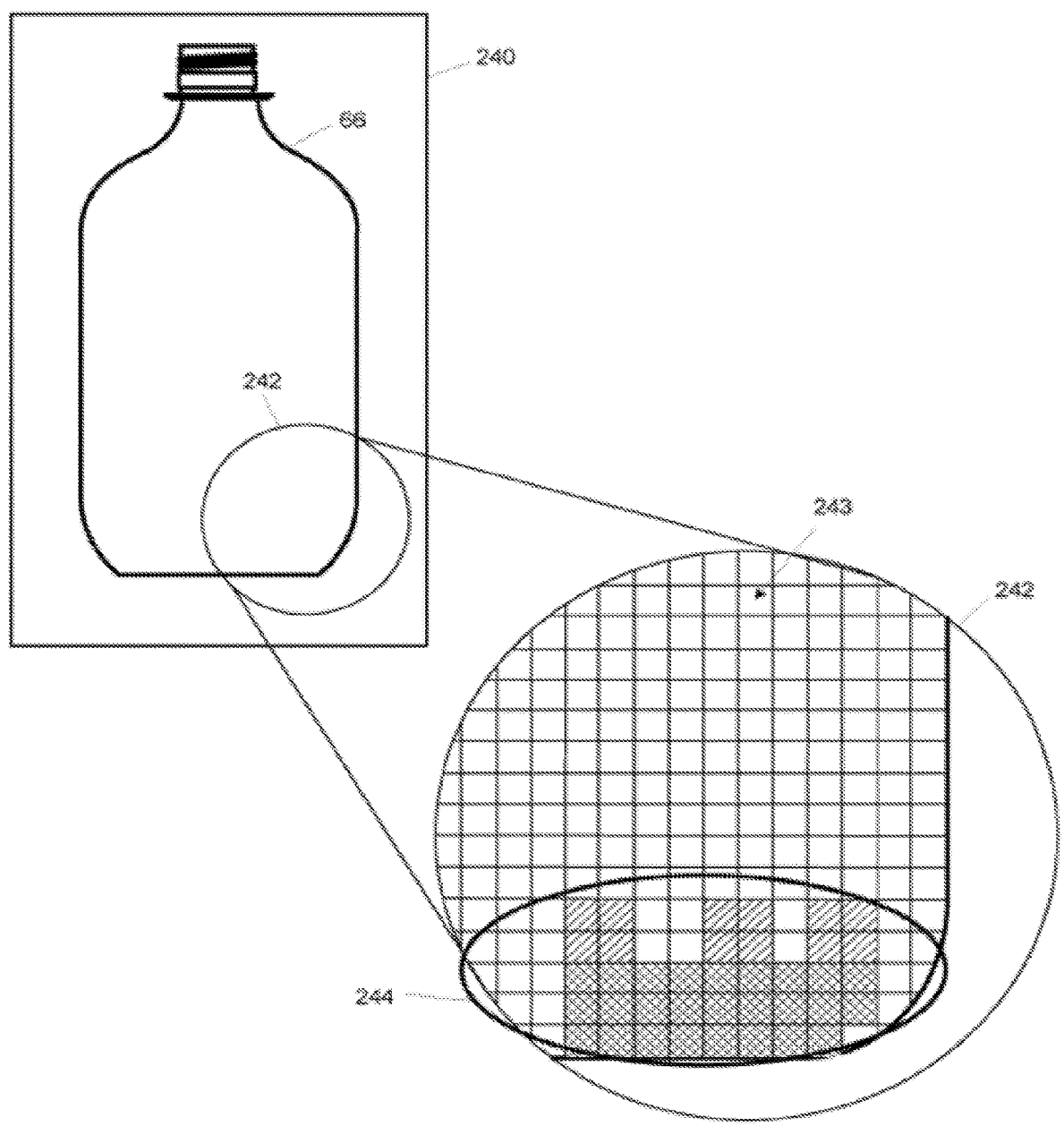
FIG. 8 is diagram showing an image of the container illustrating various methods for determining clarity status.

In some embodiments, outputs of the various vision systems 108, 110, 112 are utilized to determine the presence of haze or pearlescence, generally referred to herein as a clarity status. Processing to determine the clarity status of containers may be performed by the blow molder controller 102 and/or by any of the various image processors 210, 210', 210" described herein. Any suitable image processing algorithm may be utilized to determine haze or pearlescence status (e.g., the clarity status) of a container. For example, FIG. 8 is diagram showing an image 240 of the container 66 illustrating various methods for determining clarity status. The image 240 is comprised of a plurality of pixels, where each pixel has a value. For example, when the image 240 is a gray-scale image, each pixel may have a value indicating the brightness of the image at the location of the pixel. When the image is a color image, the value of each pixel may indicate color as well as brightness. In FIG. 8, the emphasis area 242 is reproduced in larger form to illustrate image pixels 243. Gray-scale values for various pixels are indicated by shading. In practice, the blow molder controller 102, or other suitable processor, may identify instances of haze or pearlescence by examining the images for anomalous pixels. Anomalous pixels may be pixels having a gray-scale or other value that is different from the expected value, for example, indicating that the container 66 is darker than expected. Anomalous pixels may be identified in any suitable manner. For example, anomalous pixels may be darker than a threshold value and/or greater than a threshold amount darker than the average of all pixels making up the bottle. Pearlescence or haze may be detected, for example, by identifying a total number of anomalous pixels in the area representing the container 66 and/or a portion thereof (e.g., a base portion). Also, in some embodiments, a size and or number of contiguous groupings of anomalous pixels, such as grouping 244, may be utilized. Results of the algorithm may be expressed in a binary manner (e.g., pearlescence or haze is present; pearlescence or haze is not present) or in a quantitative manner, for example, based on the number of anomalous pixels or pixel groupings.

Figure 9:
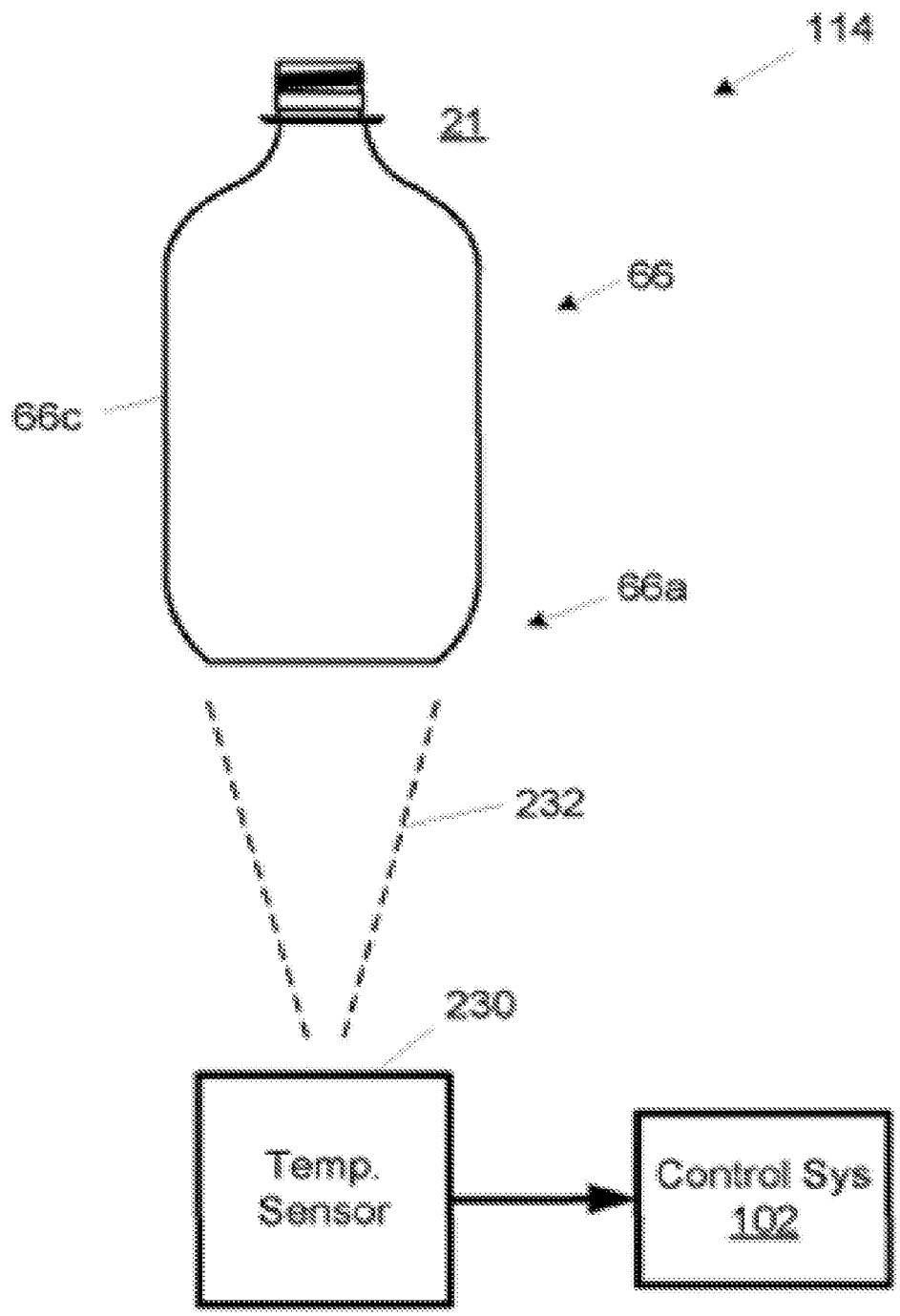
FIG. 9 is a diagram showing one embodiment of a base temperature sensor system.

FIG. 9 is a diagram showing one embodiment of a base temperature sensor system 114. The system 114 may comprise a temperature sensor 230 positioned with a field of view 232 that includes the base 66a of the container 66. The temperature of the base 66a of the container 66 may be taken while the container 66 is in the inspection area 21, with the container 66 positioned in the field of view of the temperature sensor 230. The temperature sensor 230 may comprise any suitable non-contact or infrared sensor including, for example, any suitable pyrometer, an infrared camera, etc. Signals from the sensor 230 may be provided to the blow molder controller 102 and/or another suitable processor for deriving a base temperature from the signals. It will be appreciated that various other temperature sensors may be utilized including, for example, a sidewall temperature sensor (not shown) with a field of view directed at the sidewall area 66c of the container 66.

Figure 10:
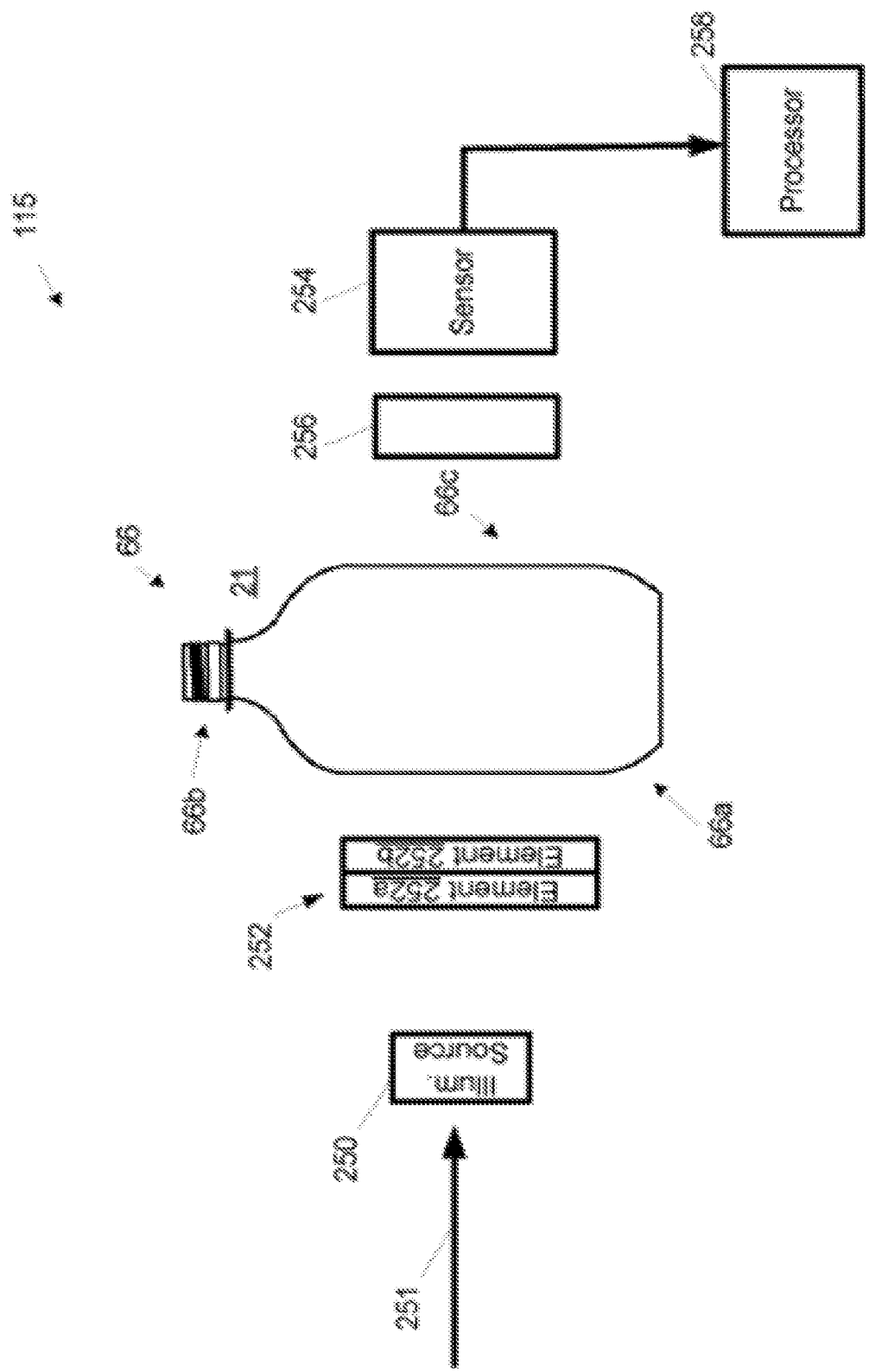
FIG. 10 is a diagram showing one embodiment of a birefringence sensor system for measuring crystallinity and/or orientation.

FIG. 10 is a diagram showing one embodiment of a birefringence sensor system 115 for measuring crystallinity and/or orientation. Birefringence is an effect found in many materials, including PET. In some embodiments, a birefringence sensor system 115 may be utilized in conjunction with cold mold-generated containers to measure crystallinity (or orientation) expressed as bi-axial lattice structure. Birefringence occurs when linearly polarized light with two orthogonal components travel at different rates through a material. Because the orthogonal components travel at different rates through the container 66, there is a resulting phase difference between the two light components. The difference in the rates of travel of the light components, and therefore the observed phase difference, depends on the level of crystallinity exhibited by the container. For example, one component may be considered the fast beam and the other a slow beam. The difference in rate, and therefore phase, is measured as retardance, which is the integrated effect of birefringence acting along an optical path in a material. Retardance is often measured according to a unit of (nm/cm thickness). Retardance can also be expressed as a phase angle when considering the wavelength of light used.

To measure retardance, a birefringence sensor system 115 may transmit linearly polarized light through the container 66. The system 115 may comprise an illumination source 250, a polarizer 252, and a sensor 254. Measurements of crystallinity may be taken while the container 66 is in the inspection area 21, which may be positioned between the illumination source 250 and the sensor 254. For example, the illumination source 250 and polarizer 252 may be positioned on one side of the container 66 and configured to illuminate the container 66. The sensor 254 may be positioned on a side of the container 66 opposite the illumination source 250 and polarizer 252 and may be configured to receive the illumination provided by the illumination source 250. The polarizer 252 may be oriented to cause illumination directed towards the container 66 to be linearly polarized with two orthogonal components. For example, the polarizer 252 may comprise two polarizer elements, 252a, 252b oriented orthogonal to one another about an optical axis 251. In some embodiments, the orientation of the linear polarizer 252 may be rotated about 45° relative to the axis of crystallization of the container 66. A sensor 254 opposite the source may receive the light, including the two orthogonal components. In some embodiments, an optional electrically controlled liquid crystal variable polarization device 256 or equivalent that filters the light is placed between the container 66 and the sensor 254. The variable polarization device 256 may be modified to allow the sensor 254 to alternately sense the two formerly orthogonal components of the incident beam and thereby measure the phase difference and/or difference in rate. For example, the angle difference between the positions of the variable polarization device 256 when measuring the two formerly orthogonal components may be proportional to the phase difference. The amount of phase difference per unit thickness of the container walls is the retardance. Accordingly, the end result may be a function of crystallinity and the thickness of the material. For example, the blow molder controller 102 may utilize container thickness (e.g., as measured by the material distribution system 106) to back-out a quantitative measurement of container crystallinity. Although the system 115 is illustrated in a configuration that directs the illumination through the sidewall regions 66c of the container 66, the system 115 may be configured to measure birefringence through any suitable portion of the container 66. In some embodiments, the sensor system 115 also comprises a processor 258. The processor 258 may, for example, process the output of the sensor 254 to generate a crystallinity reading for the container 66. In embodiments including the variable polarization device 256, the processor 258 may also be in communication with the variable polarization device 256 to control its polarization value. In various embodiments, some or all of these functionalities may be executed by the blow molder controller 102. For example, the processor 258 may be omitted. Also, any suitable method or apparatus may be used for measuring birefringence or retardance. Examples of suitable methods and apparatuses for measuring birefringence or retardance may be found in the following sources, which are incorporated herein by reference in their entireties: Hagen, et al., "Compact Methods for Measuring Stress Birefringence;" Ai et al., "Testing stress birefringence of an optical window," SPIE Vol. 1531 Advanced Optical Manufacturing and Testing II (1991); Dupaix et al., "Finite strain behavior of poly(ethylene terephthalate) (PET) and poly (ethylene terephthalaate)-glycol (PETG), Polymer," Vol. 46, Iss. 13, pgs. 4827-4838 (17 Jun. 2005); and U.S. Pat. No. 5,864,403, filed on Feb. 23, 1998.

Figure 11:
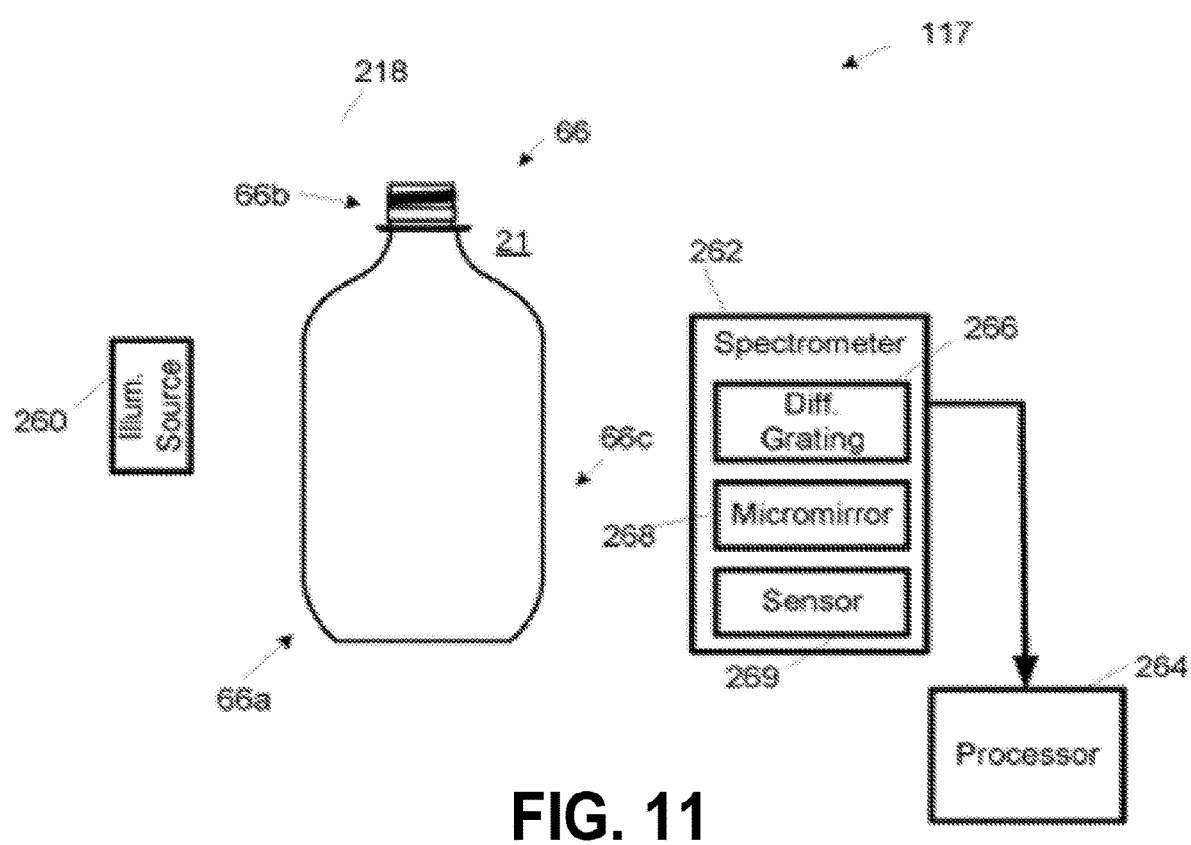
FIG. 11 is a diagram showing one embodiment of a near infrared (NIR) spectroscopy sensor system for measuring crystallinity.

FIG. 11 is a diagram showing one embodiment of a near infrared (NIR) spectroscopy sensor system 117 for measuring crystallinity. The system 117 may be positioned in the inspection area 20 of the blow molder system 4 and/or downstream of the blow molder system 4. In some embodiments, a NIR spectroscopy sensor system 117 may be used in conjunction with hot mold-generated containers to measure crystallinity expressed as spherulitic structure. The system 117 comprises an illumination source 260 positioned on one side of the container 66 and a spectrometer 262 positioned on another side of the container 66 opposite the container 66. The illumination source 260 and spectrometer 262 may be configured to measure absorption through the container 66 over all or a portion of the near infrared spectrum. For example, the illumination source 260 and spectrometer 262 may measure absorption across a wavelength range of 800 nm to 3000 nm. In some embodiments, the illumination source 260 and spectrometer 262 may measure absorption across a wavelength range of 2000 nm to 2400 nm.

The illumination source 260 and spectrometer 262 may be tuned to a particular wavelength or wavelength range in any suitable manner. For example, the illumination source 260 may be a broadband source generating illumination across the desired wavelength range. The spectrometer 262 may be configured to measure the intensity of the illumination (e.g., after transmission through the container 66) at different wavelengths. For example, the spectrometer 262 may comprise a diffraction grating 266 or other suitable optical device for separating received illumination by wavelength across the desired range (e.g., spatially separating the received illumination by wavelength). A controllable micromirror 268 or other similar device may direct a portion of the spatially separated illumination corresponding to a wavelength or wavelength range to a sensor 269, such as an InGaAs detector. The sensor 269 may provide an output signal proportional to the intensity of the received illumination at the wavelength or wavelength range directed to the sensor 269 by the micromirror 268. The micromirror 268 may be progressively tuned to direct different wavelengths or wavelength ranges to the sensor 269, providing a set of signals from the sensor 269 that indicate absorption of the illumination by the container 66 over the desired wavelength range. This may be referred to as an absorption spectrum or spectrum for the container 66. For example, the amount of illumination that is transmitted by the container 66 at any given wavelength may be the inverse of the absorption of the container 66 at that wavelength.

A processor 264 may be configured to control the micromirror 268 and/or receive and store signals from the sensor 269 to determine the absorption spectrum for the container 66. In some embodiments, some or all of the functionality of the processor 264 may be performed by the blow molder controller 102. For example, the processor 264 may be omitted. Also, although the illumination is shown to intersect the container 66 at the sidewall region 66c, the absorption spectrum may be taken at any suitable portion of the container 66. Also, FIG. 11 shows just one example spectrometer 262. Any suitable type of spectrometer may be used.

Referring back to FIG. 2, the blow molder controller 102 receives container characteristic data from one or more inspection systems 103, outputs from sensors of the blow molder system 4, and/or output from sensors from the plant. The container characteristic data describes containers generated by the blow molder system 4. The sensor outputs from the blow molder sensors describe internal operating conditions of the blow molder system 4 as described above, such as the oven temperature, the preform feed rate, time stamps for blowing of the containers such that time lapses since the last blowing can be determined, individual mold temperatures, perform temperatures, etc. The data from the plant sensors can comprise the ambient plant temperature, pressure and moisture, for example. Based on the container characteristic data, the blow molder controller 102 generates sets of blow molder input parameter changes that, if applied, would move containers generated by the blow molder system 4 towards the baseline container characteristics.

In some examples, inputs provided to the system model 105 by the blow molder controller 102 include container characteristics described by the container characteristic data including, for example, container material distribution, clarity status, thickness, etc. The clarity status may indicate a haze status in a hot mold process or a pearlescence status in a cold mold process. In addition to or instead of the clarity status, the system model 104 may receive a direct measurement of container crystallinity. Based on the inputs, the system model 105 produces sets of values for blow molder input parameters. These sets of input parameters are provided to the operating cost module 107, as described herein.

Figure 12:
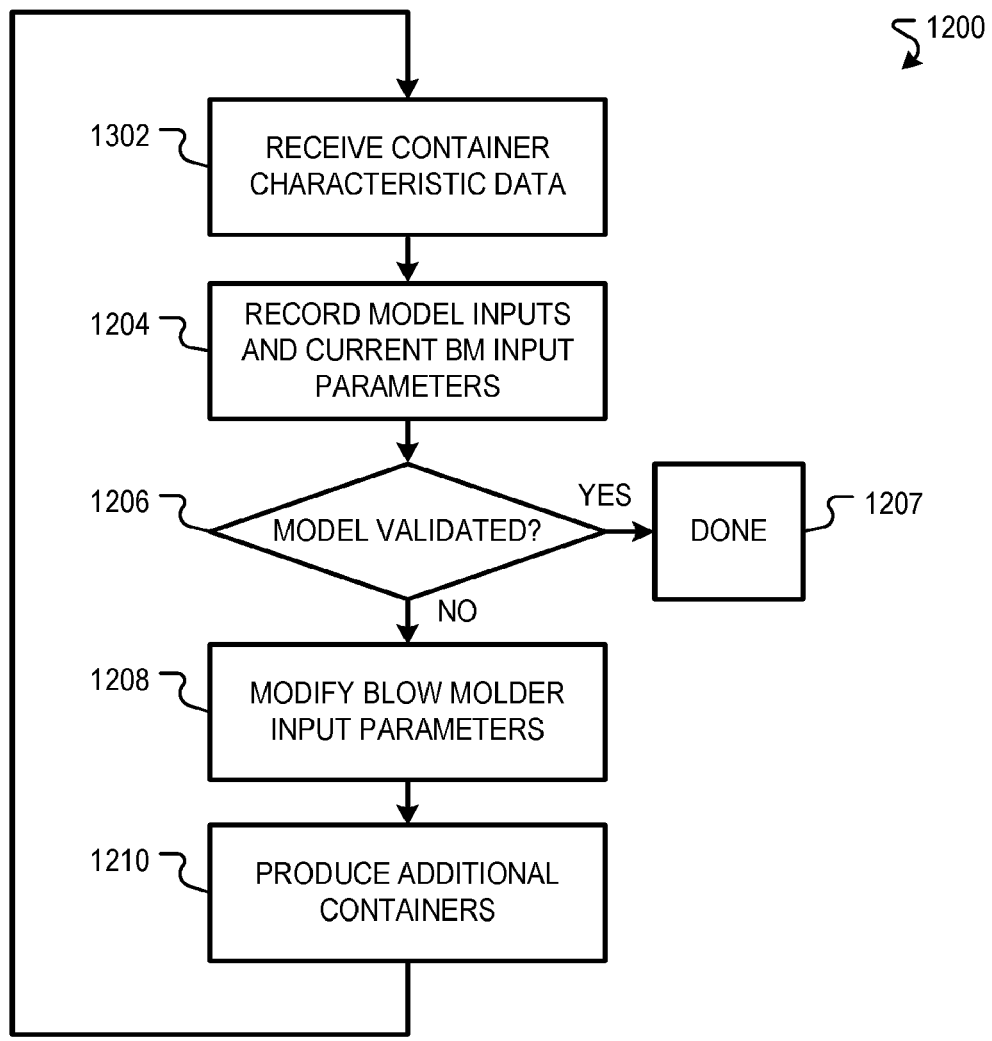
FIG. 12 is a flow chart showing one embodiment of a process flow for training the system model.

The system model 105 may be any suitable type of model and may be generated in any suitable manner. For example, the system model 105 may utilize a strong $R^2$ correlation between the container characteristics and the blow molder input parameters. The system model 105 may be implemented and trained in any suitable manner. For example, FIG. 12 is flow chart showing one embodiment of a process flow 1200 for training the system model 105. The process flow 1200 may be executed, for example, by the blow molder controller 102. At 1202, the blow molder controller 102 measures characteristics of containers generated by the blow molder system 4. For example, the material distribution may be measured in conjunction with the material distribution system 106. The clarity status may be measured in conjunction with one or more of the vision systems 108, 110, 112. The crystallinity may be measured by the birefringence sensor system 115 and/or the NIR spectroscopy system 117. In some embodiments, the operation of the blow molder system 4 is tuned (e.g., manually) prior to measuring the one or more containers such that the material distribution and clarity status of the measured containers is correct. Accordingly, the measured containers may establish a baseline material distribution, clarity status, and/or crystallinity status for the model, referred to collectively as the baseline container characteristics. The blow molder controller 102 may also establish a baseline set of blow molder input parameters that bring about the baseline container characteristics, at least in view of the blow molder system environment at the time that the baseline is determined.

In some embodiments, additional tuning may be performed relative to the crystallinity and clarity status before taking the baseline characteristic measurements at operation 1102. In a cold mold process, for example, the blow molder controller 102 may decrease the preform temperature set point until pearlescence appears (e.g., until the clarity status indicates that pearlescence is present). Then the blow molder controller 102 may increase the preform temperature set point until pearlescence is no longer present. Subsequently, the control system may take the baseline measurements at 1102. Similarly, for a hot mold process, the blow molder controller 102 may increase the preform temperature set point until haze appears (e.g., until the clarity status indicates that haze is present). Then the blow molder controller 102 may decrease the preform temperature set point until pearlescence is no longer present before taking the baseline measurements at 1102. This may ensure that the baseline measurements for the system model 105 are taken with crystallinity at or near its optimal value. Also, in various embodiments, the blow molder controller 102 may be programmed to periodically perform the described clarity tuning during operation of the blow molder system 4. This may correct for process drift, which may tend to push the blow molder system 4 away from generating containers at optimal crystallinity. In some embodiments, the baseline measurements at 1102 may be taken with the blow molder system 4 tuned to generate containers with small, but acceptable, levels of haze or pearlescence. This may drive the system model 105 to generate containers with optimal crystallinity, as described herein.

At operation 1204, the blow molder controller 102 records (e.g., stores in memory) the container characteristics of some or all of the container generated along with values of the blow molder operating parameters for the blow molder system 4 at the time that each container was produced. These values may be entered into a multi-dimensional matrix that may be used, for example, as described herein below.

At operation 1206, the blow molder controller 102 may generates a system model 105 relating blow molder input parameters and container characteristics. For example, the blow molder controller 102 may utilize the matrix to derive the model of blow molder system 4 parameters versus resulting container characteristics. The system model 105 may be generated using any suitable technique or techniques. Example modeling techniques that may be used include, for example, linear regression methods, stepwise regression, principle components regression, etc. In some embodiments, the relationship between blow molder input parameters and material distribution indicated by the model is a relationship between desired changes in material distribution and corresponding changes in blow molder input parameters.

Optionally, the model may be tested or validated upon generation at operation 1206. If the model validates, then the model generation may be complete at operation 1207. If the model fails to validate, the blow molder controller 102 may modify the blow molder input parameters at operation 1208 and generate new containers at operation 1210. The model may fail to validate, if the model generates blow molder input parameters that are out of an acceptable range, or the characteristics of the containers generated during the actions operation 1202, operation 1204 do not represent acceptable baseline container characteristics, etc. The blow molder controller 102 may measure and/or derive the container characteristics at operation 1202, record (e.g., store in memory) the container characteristics 302 and new blow molder input parameters 306 at 1604 (e.g., to the multi-dimensional matrix) and determine, again, if the system model 105 validates at operation 1206. In some embodiments, this process is repeated until the system model 105 validates.

Figure 13:
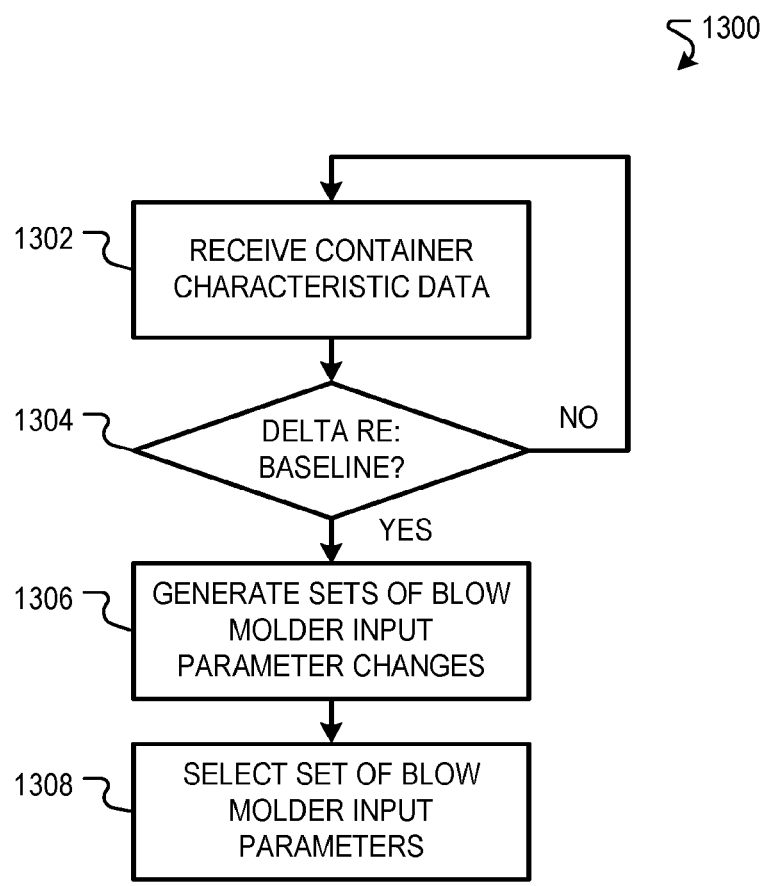
FIG. 13 is a flow chart showing one embodiment of a process flow that may be executed by the blow molder controller to apply the system model to generate sets of blow molder input parameter changes.

Once the system model 105 is generated, it may be used to generate sets of blow molder input parameters to drive containers to the baseline container characteristics, as described herein. For example, FIG. 13 is a flow chart showing one embodiment of a process flow 1300 that may be executed by the blow molder controller 102 to apply the system model 105 to generate sets of blow molder input parameter changes. At operation 1302, the blow molder controller 102 receives container characteristic data. In some examples, the blow molder controller 102 processes some or all of the container characteristic data to derive container characteristics such as, material distribution, clarity status, crystallinity, etc.

At operation 1304, the blow molder controller 102 determines if one or more of the container characteristics from operation 1302 are more than a threshold from the baseline container characteristics. If not, the blow molder controller 102 returns to operation 1302 and receives next container characteristic data.

If one or more of the container characteristics is more than a threshold from the baseline container characteristics, the blow molder controller 102 utilizes the system model 105 to generate sets of blow molder input parameters at operation 1304. For example, the blow molder controller 102 may calculate an error signal representing a difference between the container characteristics of generated containers received and/or derived at operation 1302 and the baseline characteristics measured during model training, as described with respect to FIG. 12. The error signal represents a desired change in the container characteristics generated by the blow molder system 4.

The error signal is applied to the system model 105, which may return changes that can be made to the blow molder system 4 input parameters to bring about the desired changes and drive the container characteristics back to the baseline. For example, utilizing the relationship between container characteristics and blow molder input parameters, the blow molder controller 102 may derive sets of blow molder input parameters that minimize the difference between the container parameters and the baseline container parameters (e.g., the error signal).

In one embodiment, the blow molder controller 102 generates multiple sets of changes to blow molder input parameters and, in some examples, a score for each set. A set of changes to blow molder input parameters includes one or more changes to the blow molder input parameters. The score for a set of changes to blow molder input parameters describes the effectiveness of the set such as, for example, how quickly and how effectively the changes will bring the container characteristics consistent with the baseline.

As described above, the initial baseline material distribution may be based on the containers measured to generate the model. In some embodiments, the model and/or an additionally generated model, may be used to correlate material distribution values to section weights, for example, as described in co-pending U.S. Patent Application Publication No. 2012-0130677, filed on Nov. 18, 2011.

At operation 1308, the blow molder controller 102 (e.g., the operating cost module 107 thereof) selects a set of blow molder input parameters, for example, from the sets of blow molder input parameter changes derived at operation 1306. The selected set of blow molder input parameters balances effectiveness with operating cost. Any suitable optimization method may be used. For example, the operating cost module 107 may assign an operating cost to each blow molder parameter change in the sets of blow molder parameter changes. The operating cost for a blow molder parameter change may be found, for example, as described herein with respect to FIG. 14. The operating cost module 107 selects the set of blow molder parameter changes that minimize the operating cost and the effectiveness score.

In some examples, the operating cost for a blow molder parameter change or set of parameter changes considers the downstream line efficiency cost. The downstream line efficiency cost may be mined from data collection systems at the plant and may describe the effect of a change in a blow molder input parameter (such as a high pressure air-related parameter) on other blow molder systems in the plant.

In some examples, the operating cost module 107 may also consider an expected scrap rate. For example, the efficiency score for a set of blow molder parameter changes may include a component indicating the time until the blow molder system 4 reaches the baseline. Longer times may indicate higher scrap rates. The operating cost module 107, in some examples, selects a set of blow molder parameter changes to minimize the scrap rate as well as the operating cost.

In some examples, the operating cost module 107 also considers a state of the blow molder system 4 and/or the state of the plant, including, for example, current oven temperature, preform feed rate, time since last blowing container, ambient plant temperature, mold temperatures, preform temperature, etc. These data may be input from sensors of the blow molder system 4 and/or the plant, as described above. For example, the incremental cost of blow molder input parameters may depend on the current state of the blow molder system 4, as described herein. The operating cost module 107 may determine the operating cost of each of the sets of blow molder input parameters by finding an operating cost for each change of the blow molder input parameters in the sets of changes determined using the system model 105.

Figure 14:
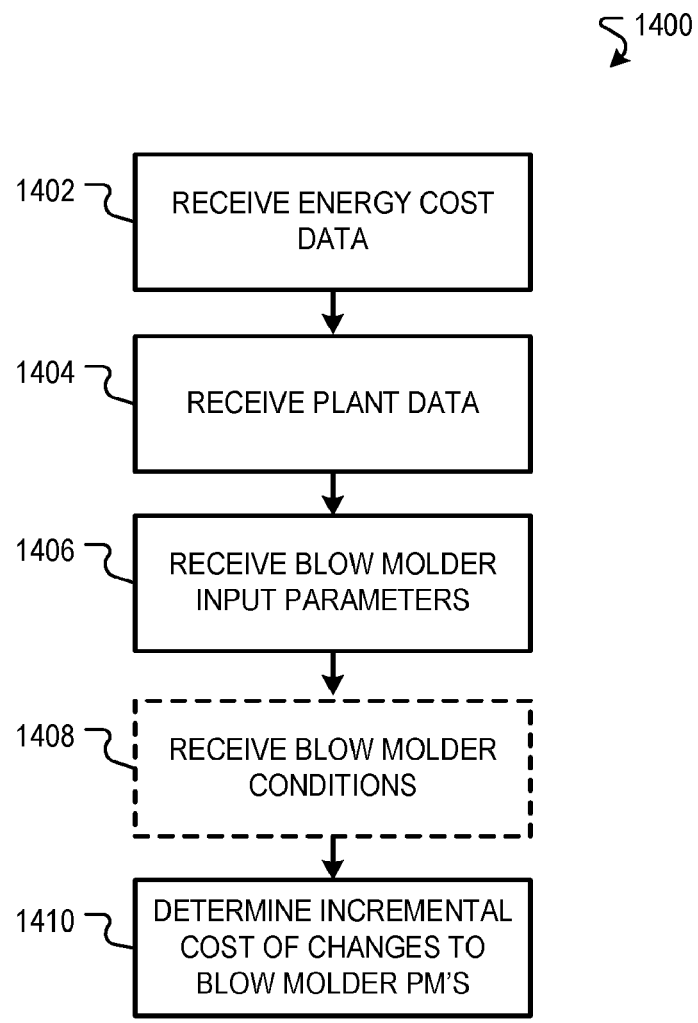
FIG. 14 is a flowchart showing one example of a process flow that may be executed by the operating cost module to generate sets of blow molder input parameter changes.

FIG. 14 is a flowchart showing one example of a process flow 1400 that may be executed by the operating cost module 107. For example, the operating cost module 107 may execute the process flow 1400 to determine the incremental cost of changing various blow molder input parameters. At operation 1402, the operating cost module 107 receives operating cost data describing the cost of energy at the blow molder system 4. These data may be input to the blow molder controller 102 via a user or data interface as described above. The energy cost data depend, for example, on the operating costs at the location where the blow molder system 4 is operating. The cost of energy, for example, describes a cost of electricity from an electric grid. Electricity from the grid may be used to power blow molder ovens, generate compressed air for blowing containers, etc. In some examples, some or all of the energy for operating the blow molder is from generators, pumps, or other components powered by internal combustion engines, solar panels, etc. When some or all of the energy for powering the blow molder system 4 is derived from sources of this type, the cost of energy may include the cost of diesel or other fuel, maintenance costs for generators, solar panels, etc.

At operation 1404, the operating cost module 107 receives and/or accesses plant data describing the arrangement of the plant where the blow molder system 104 is operated. Plant data may include, for example, data describing a system for generating and distributing pressurized air. For example, generating and distributing high pressure air to blow molders may consume a significant portion of the energy consumed by a blow molder. Data describing the system for generating and distributing pressurized air may include, for example, data describing the efficiencies of the air compressors, data describing the number of blow-molders at the plant being supplied with high pressure air, data describing the layout of the high pressure air manifold within the plant, etc.

At operation 1406, the operating cost module 107 receives and/or accesses the blow molder operating parameters that are available for modification by the blow molder controller 102. Blow molder operating parameters that may be modified by the blow molder controller 102 may include, for example, total oven power, individual oven lamp power, preform temperature set point, pre-blow start, pre-blow duration, stretch rod timing, blow pressure, etc.

At optional operation 1408, the operating cost module 107 receives and/or accesses data describing a state of the blow molder system 4 such as, for example, current oven temperature, preform feed rate, time since last blowing container, ambient plant temperature, mold temperatures, preform temperature, and desired preforms rejected prior to start. In some examples, the operating cost of various changes to blow molder input parameters is dependent on the current state of the blow molder system 4.

At operation 1410, the operating cost module 107 determines the cost of incremental changes to the blow molder input parameters that are available for modification in view of the operating cost received at operation 1402. For example, the operating cost of increasing the blow pressure and/or increasing the duration of the pre-blow may be found considering the cost of electricity, the efficiency of the compressor or compressors for generating high pressure air, and an efficiency of the manifold system for providing high pressure air to the blow molder system 4. The operating cost of increasing an oven temperature setting may be found by accessing or determining an incremental change in the power drawn by the oven in view of the change. In some examples, the operating cost module 107 also considers reductions in energy consumption caused by blow molder input parameter changes that, for example, lower blow pressure, reduce the duration of the pre-blow, lowering the temperature at an oven, etc.

In some examples, where the operating cost of incremental changes to the blow molder parameters depends on blow molder system and/or plant conditions, the operating cost module 107 may re-execute all or parts of the process flow 1400 under different blow molder system and/or plant conditions and recalculate incremental costs of changes to blow molder system parameters.

In other embodiments, instead of determining multiple sets of blow molder input parameters and then computing the incremental costs of implementing each set in order to determine the set that is output to the blow molder system, the blow molder controller 102 could incorporate the costs of making the incremental changes into the system model matrix that relates blow molder input parameters and container characteristics. For example, blow molder input parameters that have a high relative cost would be weighted lower than blow molder input parameters that have a lower relative cost. For example, if either an oven temperature increase or a blow pressure increase will cause a desired effect in container characteristics, and at a particular plant location it is significantly more expensive to make the necessary increase in blow molder oven temperature than to make the necessary change the blow pressure, the respective matrix weightings for oven temperature increase and blow pressure increase can cause the optimization of matrix parameters by the system model 105 to determine that blow pressure should be increased rather than increasing the oven temperature, without having to generate multiple sets of blow molder input parameter changes at step 1306 of FIG. 13, for example.

The systems and methods herein may be used across a variety of production conditions for the blow molder system 4. In some examples, the systems and methods described herein are useful dealing with step-wise changes, slower environment changes, and start-up. Step-wise process changes cause the blow molder system 4 to vary both quickly and over long periods of time. For example, when a new batch or gaylord of preforms is dumped into the descrambler for the blow-molder, differences in resin chemical properties and the temperature of the preforms causes a step-wise change in the process that can immediately result in the production of bad containers. Each time a new batch of preforms is added, the process can jump.

In some examples, in response to a step-wise process change, the blow molder controller 102, using the system model 105, would return sets of changes to blow molder parameters that would add or subtract oven energy, modify, global mold control parameters such as pre-blow start, pre-blow duration, stretch rod timing, and/or blow pressure etc. The operating cost module 107 may consider how the change will affect the quality of the blown container, (e.g. the effectiveness scores generated using the system model 105) and the marginal cost impacts of the sets of changes to blow molder parameters.

The blow molder controller 102 may also report energy correlated usage or efficiency based on individual molds, spindles or heaters. Reporting blow molder elements that are more costly than other similar elements would be useful to monitor operating costs. For example, if one preform heating element is costing more than another to operate, or one mold is more costly to heat than another, or one pressure line has to be set higher than the others and may becoming blocked. This could add elements of a replacement needed, give guidance for preventative maintenance and introduce predictive diagnostics. Eliminating unplanned downtime enhances efficiency and improves operating costs.

The blow molder controller system 102 as described herein may also be useful in the event of condition drift while the blow molder system 4 is in use. For example, in some plants, the ambient air temperature can drift up and down by 10 to 20 C. This results in slowly changing container quality that may first appear at the worst performing molds. The time-to-detect determines how many bad containers are produced. Making matters worse, when detected, the changes implemented by the operator will effectively unwind the process and do so without regard to its overall cost. As with step-wise events, the slowly moving changes that affect container quality along with the cost of the process can be automatically adapted and consistently adjusted to obtain quality containers for an optimized cost value.

In other embodiments, the cost model may choose to place limits on controls that are possible but require higher than allowed expense. For instance, a higher pressure may be achievable but prolonged use may cause long term effects that will result in unplanned down time or outages. There may also be periods of time that energy usage is limited due to rolling brownouts or peak energy usage that the cost model may consider and choose to throttle back production. It would also be possible to slow production and energy usage to meet budgetary constraints at the facility.

The blow molder controller system 102 as described herein may also be useful upon startup. For example, each time the blow molder system 4 pauses due to a downstream container flow issue, there may be cooling in the ovens. The amount of cooling depends on the length of time the blower is paused. This can create a different startup condition each time. When re-starting a blow molder system 4 after it has been down for some time, the most efficient blow molder input parameter changes may also be the costliest. The operating cost module 107 may reduce the operating cost incurred by a blow molder system 4 on startup. In some examples, the blow molder controller 102 may execute the process flow 1400 when a startup is detected to determine incremental costs of changing blow molder parameters on different blow molder 4 conditions.

In one general aspect, therefore, the present invention is directed to a blow molder system 4 comprising a blow molder 6 that produces containers from preforms. The blow molder comprises a plurality of molds and a blow molder sensor for sensing an operating condition of the blow molder. The blow molder system 4 also comprises a container inspection system 20 for inspecting the containers produced by the blow molder. In addition, the blow molder system comprises a blow molder controller 102 that is in communication with the blow molder and the container inspection system. The blow molder controller is configured to: (a) receive outputs from the blow molder sensor and the container inspection system; (b) determine a set of blow molder input parameters for the blow molder that drives the containers generated by the blow molder toward a desired container characteristic, wherein the set of blow molder input parameters are determined based on: (i) the outputs from the container inspection system and blow molder sensor; and (ii) operating cost data for the blow molder, wherein the operating cost data comprises energy costs for operating the blow molder; and (c) output the set of blow molder input parameters to the blow molder for implementation by the blow molder.

In another general aspect, the present invention is directed to a method comprising the steps of producing, by a blow molder, blow-molded containers from preforms and, during production of the blow-molded containers, sensing, by a blow molder sensor, an operating condition of the blow molder. The method further comprises the step of inspecting, by a container inspection system, the blow-molded containers produced by the blow molder. In addition, the method comprises the step of determining, by a blow molder controller that is in communication with the blow molder and the container inspection system, a set of blow molder input parameters for the blow molder that drives the containers generated by the blow molder toward a desired container characteristic, wherein the set of blow molder input parameters are determined based on: (i) outputs from the container inspection system and blow molder sensor; and (ii) operating cost data for the blow molder, wherein the operating cost data comprises energy costs for operating the blow molder. The method further comprises the step of outputting, by the blow molder controller, the set of blow molder input parameters to the blow molder for implementation by the blow molder. In addition, in various embodiments, the method may further comprise the step of, after outputting the set of blow molder input parameter to the blow molder, producing, by the blow molder, blow-molded containers with the set of blow molder input parameters from the blow molder controller. In addition, the method may further comprise the steps of inputting, by a user via a user interface of the blow molder controller, and receiving by the blow molder controller via the user interface, the operating cost data.

In various implementations, the blow molder controller determines the set of blow molder input parameters that optimizes a plurality of factors, where the plurality of factors comprise satisfaction of the desired container characteristic; time to reach the desired container characteristic; and operating costs for the blow molder to implement the set of blow molder input parameters, wherein the operating costs are based on the operating cost data for the blow molder. In addition, the plurality of factors may further comprise an expected scrap rate for containers produced by the blow molder until the containers reach the desired container characteristic. Also, the operating cost data for the blow molder may comprise incremental costs to make changes to the operating parameters of the blow molder, where the incremental costs are based, at least in part, on the energy costs for operating the blow molder.

In various implementations, the blow molder controller determines the set of blow molder input parameters by performing steps that comprise: (a) determining multiple sets of blow molder input parameters, wherein each of the multiple sets of blow molder input parameters drives the containers generated by the blow molder toward the desired container characteristic; (b) determining an incremental cost associated with each of the multiple sets of blow molder input parameters; and (c) selecting a first set of blow molder input parameters from the multiple sets of blow molder input parameters based on the incremental costs associated with each of the multiple sets of blow molder input parameters. The incremental costs can be determined based on current operating parameters of the blow molder and the energy costs for the blow molder, where the current operating parameters of the blow molder are sensed, at least in part, by the blow molder sensor.

In various implementations, the set of blow molder input parameters comprises a change to at least one of the following operating parameters of the blow molder: pre-blow timing; pre-blow pressure; power levels for individual heater elements of the plurality of molds; preform temperature set points; stretch rod timing; and/or blow pressure.

In various implementations, the container inspection system comprises a material distribution sensor system for sensing a material distribution characteristic of the containers. The material distribution sensor system may comprise one or more emitter-detector pairs, where the emitter emits light energy toward the containers and the detectors detect light energy that passes through a sidewall (e.g., through two sidewalls) of the containers. In various implementations, the container inspection system may comprise a crystallinity sensor for sensing a crystallinity level of the containers. The crystallinity sensor may comprise a camera, a birefringence sensor or a NIR spectroscopy sensor. The blow molder sensor may comprise an oven temperature sensor; individual mold temperature sensors for the plurality of molds; and/or a blow pressure sensor. The desired container characteristic may include a desired container sidewall thickness and/or a desired crystallinity level. The energy costs may include electricity costs for a plant where the blow molder is located. Also, the blow molder blows a fluid, such as air or liquid, into the preforms to form the containers.

The examples presented herein are intended to illustrate potential and specific implementations of the embodiments. It can be appreciated that the exemplary embodiments are intended primarily for purposes of illustration for those skilled in the art. No particular aspect or aspects of the examples is/are intended to limit the scope of the described embodiments.

As used in the claims, the terms "container(s)" and "plastic container(s)" mean any type of blow-molded container made from any type of plastic material including, polyethylene terephthlat (PET), oriented polypropolyene (OPP), etc.

Figure 15:
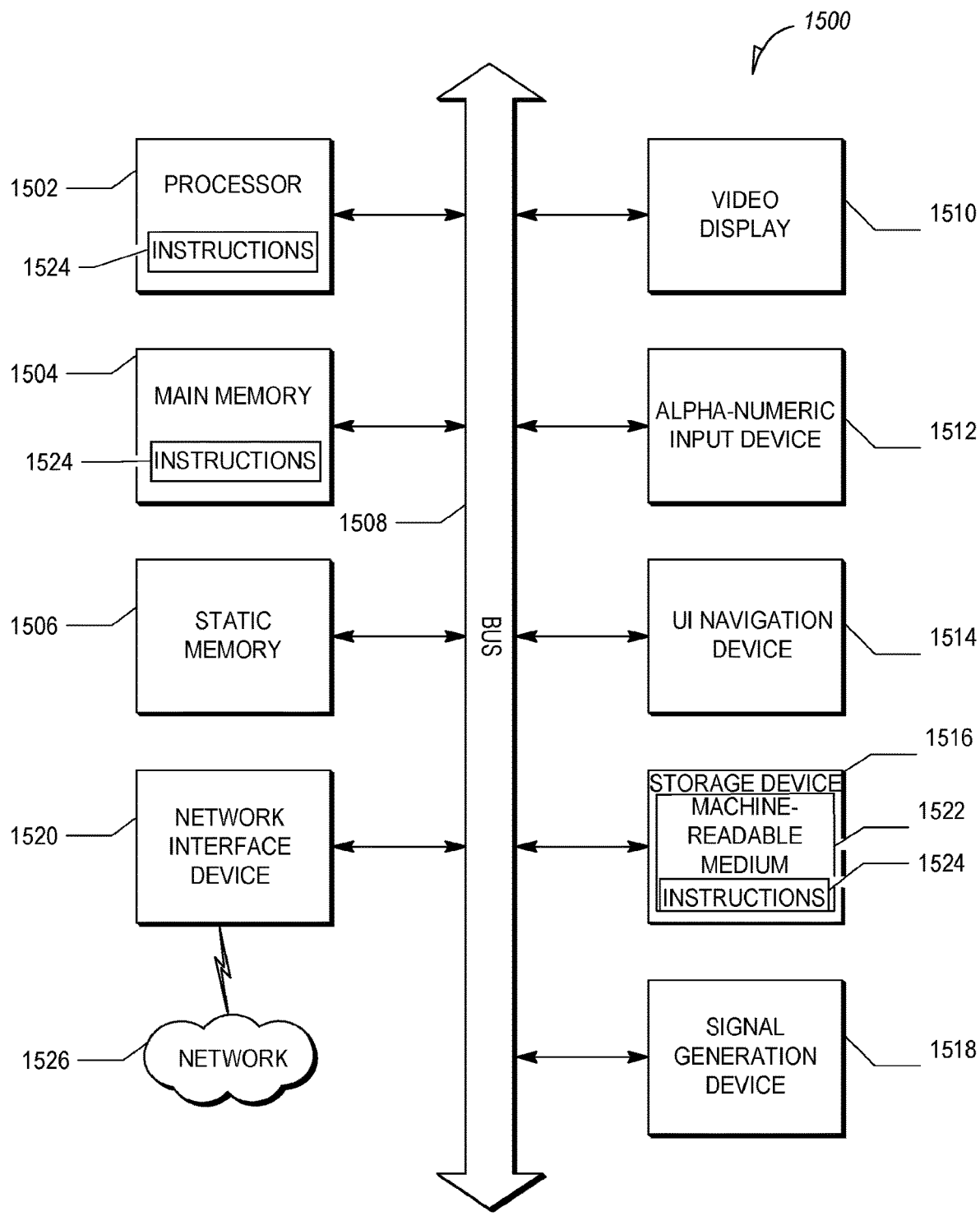
FIG. 15 is a block diagram illustrating a computing device hardware architecture, within which a set or sequence of instructions can be executed to cause a machine to perform examples of any one of the methodologies discussed herein.

FIG. 15 is a block diagram illustrating a computing device hardware architecture 1500, within which a set or sequence of instructions can be executed to cause a machine to perform examples of any one of the methodologies discussed herein. For example, the blow molder controller 102 may be executed on a computing device having an architecture similar to the architecture 1500. The architecture 1500 may describe, for example, any of the computing devices described herein. The architecture 1500 may execute the software architecture 702 described with respect to FIG. 7. The architecture 1500 may operate as a standalone device or may be connected (e.g., networked) to other machines. In a networked deployment, the architecture 1500 may operate in the capacity of either a server or a client machine in server-client network environments, or it may act as a peer machine in peer-to-peer (or distributed) network environments. The architecture 1500 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1500 includes a processor unit 1502 comprising at least one processor (e.g., a central processing unit (CPU), a graphics processing unit (GPU), or both, processor cores, compute nodes, etc.). The architecture 1500 may further comprise a main memory 1504 and a static memory 1506, which communicate with each other via a link 1508 (e.g., bus). The architecture 1500 can further include a video display unit 1510, an alphanumeric input device 1512 (e.g., a keyboard), and a UI navigation device 1514 (e.g., a mouse). In some examples, the video display unit 1510, alphanumeric input device 1512, and UI navigation device 1514 are incorporated into a touchscreen display. The architecture 1500 may additionally include a storage device 1516 (e.g., a drive unit), a signal generation device 1518 (e.g., a speaker), a network interface device 1520, and one or more sensors (not shown), such as a GPS sensor, compass, accelerometer, or other sensor.

In some examples, the processor unit 1502 or another suitable hardware component may support a hardware interrupt. In response to a hardware interrupt, the processor unit 1502 may pause its processing and execute an ISR, for example, as described herein.

The storage device 1516 includes a machine-readable medium 1522 on which is stored one or more sets of data structures and instructions 1524 (e.g., software) embodying or utilized by any one or more of the methodologies or functions described herein. The instructions 1524 can also reside, completely or at least partially, within the main memory 1504, within the static memory 1506, and/or within the processor unit 1502 during execution thereof by the architecture 1500, with the main memory 1504, the static memory 1506, and the processor unit 1502 also constituting machine-readable media. The instructions 1524 stored at the machine-readable medium 1522 may include, for example, instructions for executing any of the features described herein, etc.

While the machine-readable medium 1522 is illustrated in an example to be a single medium, the term "machine-readable medium" can include a single medium or multiple media (e.g., a centralized or distributed database, and/or associated caches and servers) that store the one or more instructions 1524. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 1524 can further be transmitted or received over a communications network 1526 using a transmission medium via the network interface device 1520 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A blow molder system comprising:
    a blow molder for performing a blow molding process, wherein the blow molder comprises:
        a plurality of molds; and
        a blow molder sensor for sensing an operating condition of the blow molder;
    an inspection system for inspecting plastic objects involved in the blow molding process;
    an ambient temperature sensor for sensing an ambient temperature of a plant in which the blow molder is located; and
    a blow molder controller that is in communication with the blow molder and the inspection system, wherein the blow molder controller is configured to:
        determine a set of blow molder input parameters for the blow molder that drives the blow molding process toward a desired characteristic, wherein the set of blow molder input parameters are determined based on:
            output from the inspection system;
            output from the blow molder sensor; and
            output from the ambient temperature sensor, and
            wherein the blow molder controller is further configured to determine the set of blow molder parameters by optimizing a plurality of factors, wherein the plurality of factors comprise:
                satisfaction of the desired characteristic; and
                operating costs to implement the set of blow molder input parameters; and
        output the set of blow molder input parameters to the blow molder for implementation by the blow molder.

2. The blow molder system of claim 1, further comprising a moisture sensor for sensing a moisture level of a plant in which the blow molder is located, wherein the blow molder controller is further configured to determine the set of blow mold parameters based on moisture level data from the plant moisture sensor.

3. The blow molder system of claim 2, wherein:
    the blow molder controller is further configured to determine the set of blow molder parameters based on operating cost data for the blow molder; and
    the operating cost data comprises energy costs for operating the blow molder.

4. The blow molder system of claim 3, wherein:
    the blow molder produces plastic containers from plastic preforms; and
    the desired characteristic comprises a desired characteristic of the containers produced by the blow molder.

5. The blow molder system of claim 4, wherein the plurality of factors further comprise an expected scrap rate for containers produced by the blow molder until the containers reach the desired container characteristic.

6. The blow molder system of claim 5, wherein the set of blow molder input parameters comprises a change to at least one of the following operating parameters of the blow molder:
    pre-blow timing;
    pre-blow pressure;
    power levels for individual heater elements of the plurality of molds;
    preform temperature set points;
    stretch rod timing; and
    blow pressure.

7. The blow molder system of claim 1, wherein the blow molder controller is further configured to determine the set of blow molder parameters based on operating cost data for the blow molder.

8. The blow molder system of claim 7, wherein the operating cost data comprises energy costs for operating the blow molder.

9. The blow molder system of claim 8, wherein the operating cost data comprises incremental costs to make changes to the blow molder input parameters of the blow molder, wherein the incremental costs are based, at least in part, on the energy costs for operating the blow molder.

10. The blow molder system of claim 1, wherein:
the blow molder produces plastic containers from plastic preforms; and
the desired characteristic comprises a desired characteristic of the containers produced by the blow molder.

11. The blow molder system of claim 10, wherein the plastic objects comprise the plastic containers produced by the blow molder.

12. The blow molder system of claim 11, wherein;
the blow molder controller is further configured to determine the set of blow molder parameters based on operating cost data for the blow molder;
the operating cost data comprises energy costs for operating the blow molder; and
the energy costs comprise electricity costs for a plant where the blow molder is located.

13. The blow molder system of claim 12, wherein the blow molder controller
determines the set of blow molder input parameters by performing steps that comprise:
determining multiple sets of blow molder input parameters, wherein each of the multiple sets of blow molder input parameters drives the containers generated by the blow molder toward the desired container characteristic; and
determining an incremental cost associated with each of the multiple sets of blow molder input parameters, wherein the incremental costs are determined based on current operating parameters of the blow molder and the energy costs for the blow molder, wherein the current operating parameters of the blow molder are sensed, at least in part, by the blow molder sensor; and
selecting a first set of blow molder input parameters from the multiple sets of blow molder input parameters based on the incremental costs associated with each of the multiple sets of blow molder input parameters.

14. The blow molder system of claim 12, wherein:
the blow molder produces plastic containers from plastic preforms;
the desired characteristic comprises a desired characteristic of the containers produced by the blow molder; and
the plastic objects comprise the plastic containers produced by the blow molder.

15. The blow molder system of claim 14, wherein the inspection system comprises at least one emitter-detector pair, wherein an emitter of the at least one emitter-detector pair emits light energy and a detector of the at least one emitter-detector pair detects light energy.

16. The blow molder system of claim 15, wherein the at least one emitter-detector pair comprises a plurality of emitter-detector pairs, wherein the emitter of each emitter-detector pair emits light energy toward the containers and the detector of each emitter-detector pair senses light energy that passes through at least one sidewall of the containers.

17. The blow molder system of claim 11, wherein:
the blow molder controller is further configured to determine the set of blow molder parameters based on operating cost data for the blow molder; and
the operating cost data comprise a cost of expected scrap containers produced by the blow molder.

18. The blow molder system of claim 17, wherein the cost of expected scrap containers is determined, in part, based on a time for the blow molder to produce containers that satisfy the desired container characteristic.

19. The blow molder system of claim 11, wherein the plurality of factors that the blow molder controller optimizes to determine the set of blow molder containers further comprises a time for the blow molder to produce containers that satisfy the desired container characteristic.

20. The blow molder system of claim 10, wherein the plurality of factors further comprise an expected scrap rate for containers produced by the blow molder until the containers reach the desired container characteristic.

21. The blow molder system of claim 20, wherein the set of blow molder input parameters comprises a change to at least one of the following operating parameters of the blow molder:
pre-blow timing;
pre-blow pressure;
power levels for individual heater elements of the plurality of molds;
preform temperature set points;
stretch rod timing; and
blow pressure.

22. The blow molder system of claim 10, wherein the blow molder blows a fluid into the preforms to form the containers.

23. The blow molder system of claim 22, wherein the fluid comprises air or a liquid.

24. The blow molder system of claim 1, wherein the set of blow molder input parameters comprises a change to at least one of the following operating parameters of the blow molder:
pre-blow timing;
pre-blow pressure;
power levels for individual heater elements of the plurality of molds;
preform temperature set points;
stretch rod timing; and
blow pressure.

25. The blow molder system of claim 1, wherein the inspection system comprises a material distribution sensor system for sensing a material distribution characteristic of the plastic objects.

26. The blow molder system of claim 1, wherein the inspection system comprises a camera.

27. The blow molder system of claim 1, wherein the blow molder sensor comprises a sensor selected from the group consisting of:
an oven temperature sensor;
individual mold temperature sensors for the plurality of molds; and
a blow pressure sensor.

28. The blow molder system of claim 1, wherein the plastic objects comprise polyethylene terephthalate.

29. A blow molder system comprising:
a blow molder for performing a blow molding process, wherein the blow molder comprises:
a plurality of molds; and
a blow molder sensor for sensing an operating condition of the blow molder;
an inspection system for inspecting plastic objects involved in the blow molding process;
a moisture sensor for sensing a moisture level of a plant in which the blow molder is located; and
a blow molder controller that is in communication with the blow molder and the inspection system, wherein the blow molder controller is configured to:
determine a set of blow molder input parameters for the blow molder that drives the blow molding process toward a desired characteristic, wherein the set of blow molder input parameters are determined based on:

output from the inspection system;
output from the blow molder sensor;
output from the moisture sensor; and
operating cost data for the blow molder, wherein the operating cost data comprise energy costs for operating the blow molder, and
wherein the blow molder controller is further configured to determine the set of blow molder parameters by optimizing a plurality of factors, wherein the plurality of factors comprise:
satisfaction of the desired characteristic; and
operating costs to implement the set of blow molder input parameters; and
output the set of blow molder input parameters to the blow molder for implementation by the blow molder.

30. The blow molder system of claim 29, wherein:
the blow molder produces plastic containers from plastic preforms; and
the desired characteristic comprises a desired characteristic of the containers produced by the blow molder.

31. The blow molder system of claim 30, wherein the plurality of factors further comprise an expected scrap rate for containers produced by the blow molder until the containers reach the desired container characteristic.

32. The blow molder system of claim 31, wherein the set of blow molder input parameters comprises a change to at least one of the following operating parameters of the blow molder:
pre-blow timing;
pre-blow pressure;
power levels for individual heater elements of the plurality of molds;
preform temperature set points;
stretch rod timing; and
blow pressure.

33. A blow molder system comprising:
a blow molder for performing a blow molding process, wherein the blow molder comprises:
a plurality of molds; and
a blow molder sensor for sensing an operating condition of the blow molder;
an inspection system for inspecting plastic objects involved in the blow molding process;
an ambient temperature sensor for sensing an ambient temperature of a plant in which the blow molder is located; and
a blow molder controller that is in communication with the blow molder and the inspection system, wherein the blow molder controller is configured to:
determine a set of blow molder input parameters for the blow molder that drives the blow molding process toward a desired characteristic, wherein the set of blow molder input parameters are determined based on:
output from the inspection system;
output from the blow molder sensor;
incremental costs to make changes to the blow molder input parameters of the blow molder, wherein the incremental costs are based, at least in part, on energy costs for operating the blow molder, and
output from the ambient temperature sensor; and
output the set of blow molder input parameters to the blow molder for implementation by the blow molder.

* * * * *